US 9,442,497 B2

(12) United States Patent
Kuroiwa et al.

(10) Patent No.: US 9,442,497 B2
(45) Date of Patent: Sep. 13, 2016

(54) AIR-CONDITIONING MANAGEMENT DEVICE, AIR-CONDITIONING MANAGEMENT METHOD, AND PROGRAM

(75) Inventors: Takeru Kuroiwa, Tokyo (JP); Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 531 days.

(21) Appl. No.: 13/991,920

(22) PCT Filed: Jan. 26, 2011

(86) PCT No.: PCT/JP2011/051519
§ 371 (c)(1),
(2), (4) Date: Jun. 6, 2013

(87) PCT Pub. No.: WO2012/101787
PCT Pub. Date: Aug. 2, 2012

(65) Prior Publication Data
US 2013/0261805 A1  Oct. 3, 2013

(51) Int. Cl.
*G05D 23/00* (2006.01)
*F24F 11/00* (2006.01)
(52) U.S. Cl.
CPC ......... *G05D 23/00* (2013.01); *F24F 11/0086* (2013.01); *F24F 2011/0094* (2013.01)
(58) Field of Classification Search
None
See application file for complete search history.

(56) References Cited

U.S. PATENT DOCUMENTS

| 6,122,603 A * | 9/2000 | Budike, Jr. ............ G01D 4/004 340/870.02 |
| 2010/0070084 A1* | 3/2010 | Steinberg ............... F24F 11/006 700/276 |

FOREIGN PATENT DOCUMENTS

| JP | 2001-304648 A | 10/2001 |
| JP | 2006-336901 A | 12/2006 |
| JP | 2007-093138 A | 4/2007 |

OTHER PUBLICATIONS

International Search Report of the International Searching Authority mailed Apr. 12, 2011 for the corresponding international application No. PCT/JP2011/051519 (with English translation).

* cited by examiner

*Primary Examiner* — Kenneth M Lo
*Assistant Examiner* — Geoffrey Wellman
(74) *Attorney, Agent, or Firm* — Posz Law Group, PLC

(57) ABSTRACT

An air conditioning management device is mutually communicably connected to multiple air conditioners, and is equipped with: a storage that stores connection information that indicate remote control devices respectively controlling the plurality of air conditioners, the air conditioners connected thereto; a wasteful operation determiner that determines whether or not any of the plurality of air conditioners are in a wasteful operating state; and a wasteful operation notifier which, in the case where wasteful operation determiner determines that at least one of the plurality of air conditioners is in a wasteful operating state, notifies that the air conditioner is in a wasteful operating state to the remote control device connected to that air conditioner, on the basis of the connection information stored in the storage.

15 Claims, 14 Drawing Sheets

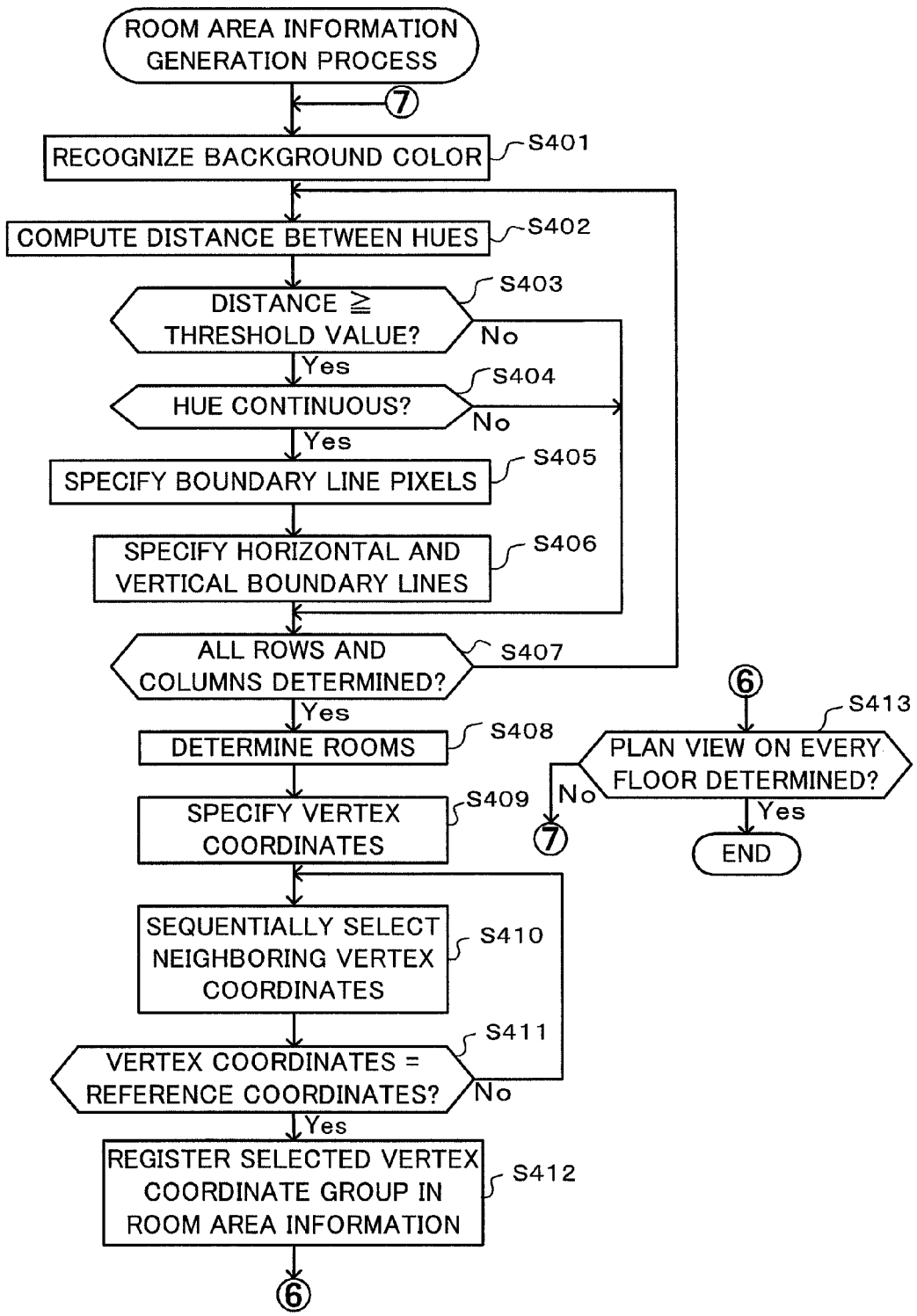

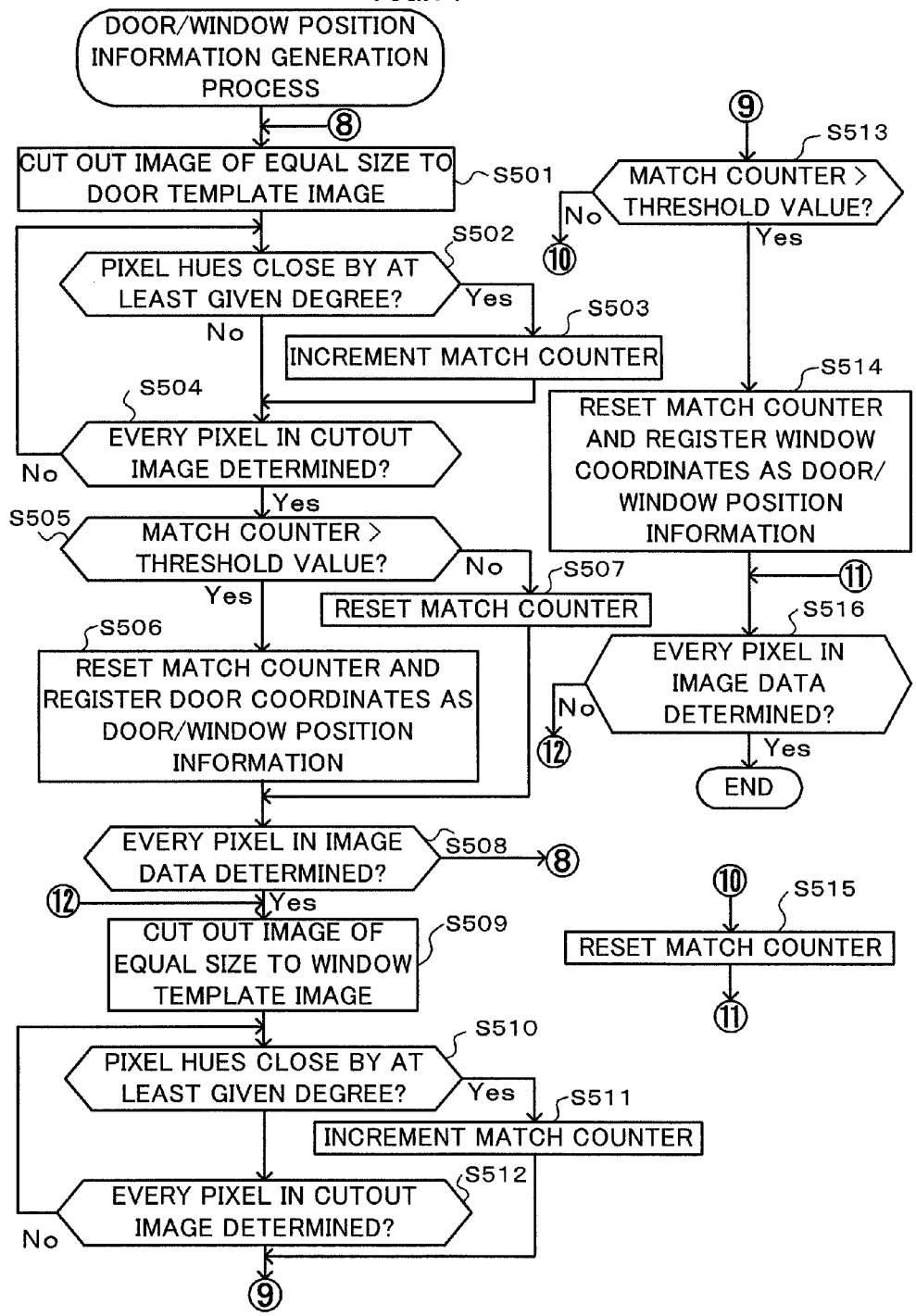

AIR-CONDITIONING MANAGEMENT DEVICE, AIR-CONDITIONING MANAGEMENT METHOD, AND PROGRAM

CROSS REFERENCE TO RELATED APPLICATIONS

This application is a U.S. national stage application of the International Patent Application No. PCT/JP2011/051519 filed on Jan. 26, 2011.

TECHNICAL FIELD

The present invention relates to an air conditioning management device, an air conditioning management method, and a program.

BACKGROUND ART

Air conditioners are typically used to adjust the temperature and humidity inside a building. The output from an air conditioner is automatically controlled so as to reach a set temperature and humidity. Many air conditioners are installed inside a building and centrally monitored at a single location.

More power efficient air conditioners are now being demanded. However, in situations such as when a window or door is open, air that has been warmed or cooled by an air conditioner will escape. As a result, the air conditioner will increase output or operate for a longer period of time to reach the set temperature, and thus enter a wasteful operating state that wastefully consumes power, inhibiting power efficiency. For this reason, various proposals are being made in order to promote power efficiency by deterring the wasteful operation of an air conditioner.

For example, Unexamined Japanese Patent Application Kokai Publication No. 2006-336901 (hereafter, "PTL 1") discloses an air conditioner monitoring apparatus that determines the wasteful operation of an air conditioner based on the position of the air conditioner's expansion valve and the duration at this position, and notifies a building supervisor or service technician.

SUMMARY OF INVENTION

Technical Problem

However, with the monitoring apparatus in PTL 1, it is difficult to estimate the positions of windows and doors which potentially cause a wasteful operation. Furthermore, since the occupants are not notified of the wasteful operation, it is also difficult to make the occupants more mindful about preventing wasteful operation, and it is not possible to rapidly cope with the wasteful operation. Consequently, the technology is not yet sufficient from the perspective of promoting power efficiency while quickly resolving the wasteful operation.

The invention has been devised in light of the above circumstances, and it is an object thereof to provide an air conditioning management device, an air conditioning management method, and a program able to contribute to quick resolution of the wasteful operation and promote power efficiency.

Solution to Problem

In order to achieve the above object, an air conditioning management device according to the present invention is an air conditioning management device mutually communicably connected to a plurality of air conditioners, and includes;

a storage that stores connection information that indicate remote control devices respectively controlling the plurality of air conditioners, the air conditioners connected to these remote control device, a wasteful operation determiner that determines whether or not any of the plurality of air conditioners are in a wasteful operating state, and a wasteful operation notifier which, in the case where wasteful operation determiner determines that at least one of the plurality of air conditioners is in a wasteful operating state, notifies that the air conditioner is in a wasteful operating state to the remote control device connected to that air conditioner, on the basis of the connection information stored in the storage.

Advantageous Effects of Invention

According to the present invention, it is possible to contribute to quick resolution of wasteful operation and promote power efficiency.

BRIEF DESCRIPTION OF DRAWINGS

FIG. 13 is a flowchart illustrating a sequence of a room area information generation process executed by the air conditioning management device in FIG. 10; and FIG. 14 is a flowchart illustrating a sequence of a door/window position information generation process executed by the air conditioning management device in FIG. 10.

DESCRIPTION OF EMBODIMENTS

Embodiments of the invention will be described in detail and with reference to the drawings.

Embodiment 1

The present embodiment will be described taking an air conditioning management system equipped with an air conditioning management device according to the present invention as an example. Note that wasteful operation refers to an air conditioner increasing output or operating for a longer period of time to reach a set temperature due to a window or door being open, and thus wastefully consuming power compared to when a window or door is not open. In addition, a wasteful operating state refers to a state in which an air conditioner is wastefully consuming power due to a window or door being open.

Figure 1:
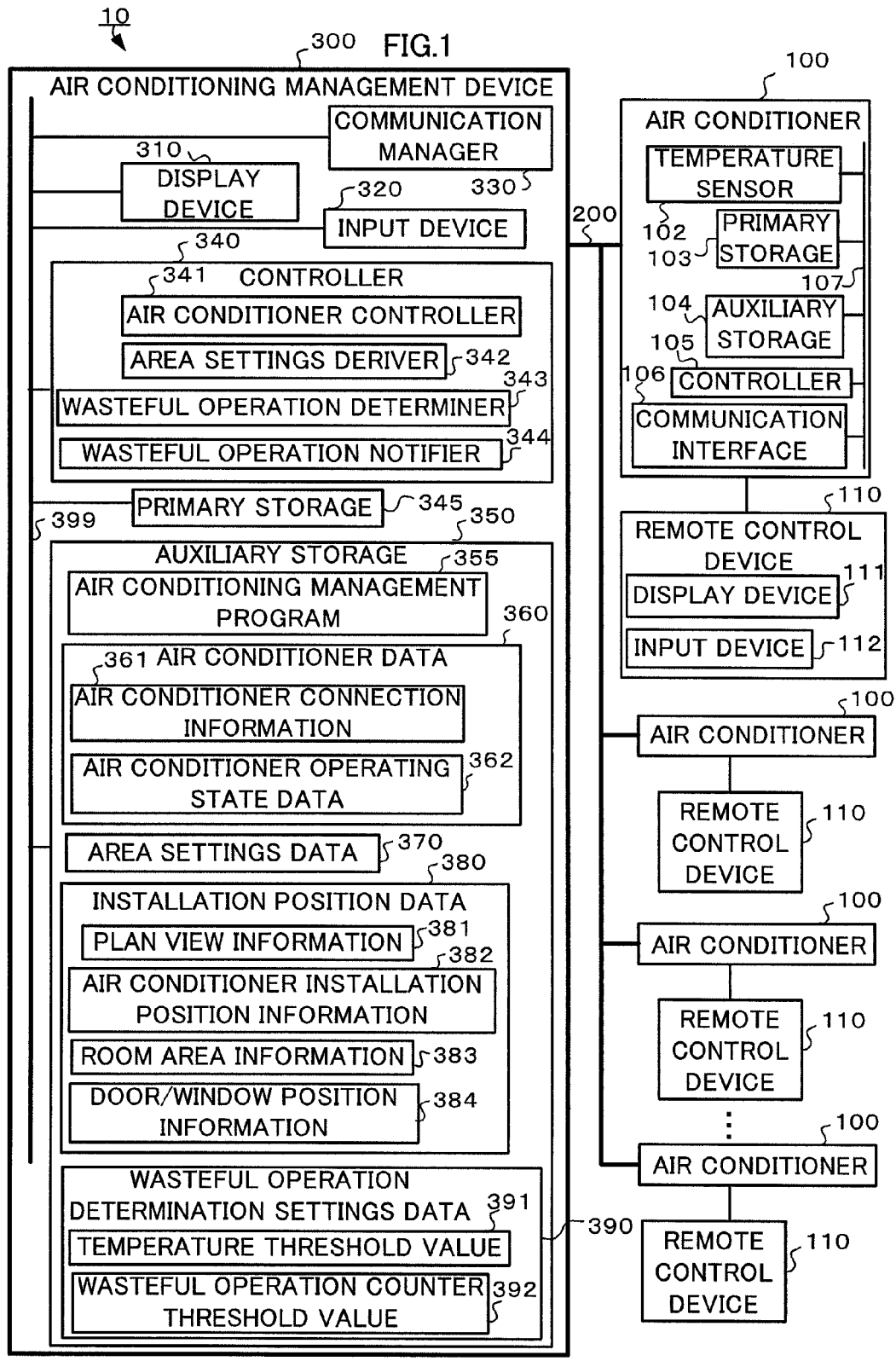
FIG. 1 is a block diagram illustrating an air conditioning management system centered on an air conditioning management device according to Embodiment 1 of the present invention.

As illustrated in FIG. 1, the air conditioning management system 10 is equipped with a plurality of air conditioners 100 and an air conditioning management device 300. Each air conditioner 100 and the air conditioning management device 300 are mutually communicably connected to each other by dedicated communication lines 200. Each air conditioner 100 is mutually communicably connected to a remote control device 110 which acts as a user control device for each air conditioner 100. Note that the air conditioning management device 300 is not only connected to each air conditioner 100, but is also mutually communicably connected by the dedicated communication lines 200 to a heat source unit (external equipment), not illustrated, that includes a compressor or the like.

The air conditioners 100 are devices that provide air conditioning inside a building (interior equipment), for example, and are respectively provided with a temperature sensor 102, primary storage 103, auxiliary storage 104, a controller 105, a communication interface 106, and a system bus 107. Each air conditioner 100 is controlled such that the temperature measured by its temperature sensor 102 reaches a set temperature determined by the air conditioning management device 300 discussed later or the remote control device 110 discussed later (hereinafter, the above is designated an air conditioning operation).

The temperature sensor 102 is a sensor that measures the temperature of the room where an air conditioner 100 is installed. The temperature measured by the temperature sensor 102 is transmitted as indoor temperature information to the controller 105 and the communication device 106.

The primary storage 103 includes a storage component such as random access memory (RAM), and is used as the work area of a CPU discussed later.

The auxiliary storage 104 includes non-volatile memory such as read-only memory (ROM), a magnetic disk, or semiconductor memory. The auxiliary storage 104 stores data and parameters required for processing by the controller 105, as well as a program (not illustrated). The auxiliary storage 104 also stores operating state data that indicates the operating state, such as the start/stop state of the air conditioner 100, the operating mode, such as heating or cooling, and the set temperature and indoor temperature.

The controller 105 comprises a central processing unit (CPU) or the like. The controller 105 operates according to a program not illustrated, and conducts air conditioning operation to bring the temperature measured by the temperature sensor 102 to the set temperature determined by the air conditioning management device 300 or the remote control device 110 discussed later. The controller 105 also periodically (every 1 minute, for example) acquires operating state data of the air conditioner 100, which is stored in the auxiliary storage 104.

The communication interface 106 includes a serial interface, or an analog interface for receiving analog signals. Information transmitted from the air conditioning management device 300 or the remote control device 110 discussed later is received by the communication interface 106, and transmitted to the CPU discussed later via the system bus 107. The communication interface 106 also transmits indoor temperature information indicating the temperature measured by the temperature sensor 102, user control information transmitted from the remote control device 110, and operating state data stored in the auxiliary storage 104 to the air conditioning management device 300 discussed later.

The remote control device 110 is a device used by a user to control the air conditioner 100 connected to that remote control device 110, and is equipped with a display device 111 and an input device 112.

The display device 111 displays information such as the operating state of the air conditioner 100 connected to that remote control device 110 to the user.

The input device 112 includes components such as a touch panel and multiple buttons. In response to the user operating these buttons and the touch panel, the input device 112 transmits user control information indicating various control instructions to the air conditioner 100 connected to that remote control device 110. Herein, the various control instructions include instructions, regarding the air conditioner 100, for starting and stopping, changing the operating mode, and changing the set temperature, airflow direction, and airflow speed, for example.

The air conditioning management device 300 is a device that centrally controls and manages the multiple connected air conditioners 100, and more specifically, conducts an air conditioning management process that includes a wasteful operation determination process and a notification process for each air conditioner 100. The air conditioning management device 300 is equipped with a primary storage 345, an auxiliary storage 350, a display device 310, an input device 320, a communication manager 330, a controller 340, and a system bus 399 mutually connected to each of the above components.

The primary storage 345 includes components such as RAM, and is used as the work area of a CPU discussed later.

The auxiliary storage 350 includes non-volatile memory such as ROM, a magnetic disk, or semiconductor memory. The auxiliary storage 350 stores data and parameters required for processing by the controller 340, as well as an air conditioning management program 355. Specifically, the auxiliary storage 350 stores air conditioner data 360, area settings data 370, installation position data 380, and wasteful operation determination settings data 390 as the data and parameters required for processing by the controller 340.

The air conditioning management program 355 is a program stating a series of operations for realizing air conditioning management functionality.

The air conditioner data 360 contains air conditioner connection information 361 and air conditioner operating state data 362.

The air conditioner connection information 361 is data such as addresses for air conditioners 100 managed by the air conditioning management device 300, control group numbers which associate air conditioner identification information identifying an air conditioner 100 with the remote control device 110 connected to that air conditioner 100, and identification information that identifies the model of an air conditioner 100.

The air conditioner operating state data 362 is state data such as the start/stop state of each air conditioner 100, the operating mode, such as heating or cooling, and set temperature and indoor temperature. Every time operating state data is received from an air conditioner 100, the information indicated by the received operating state data is processed by the controller 340 and registered in the auxiliary storage 350 as air conditioner operating state data 362.

Figure 2:
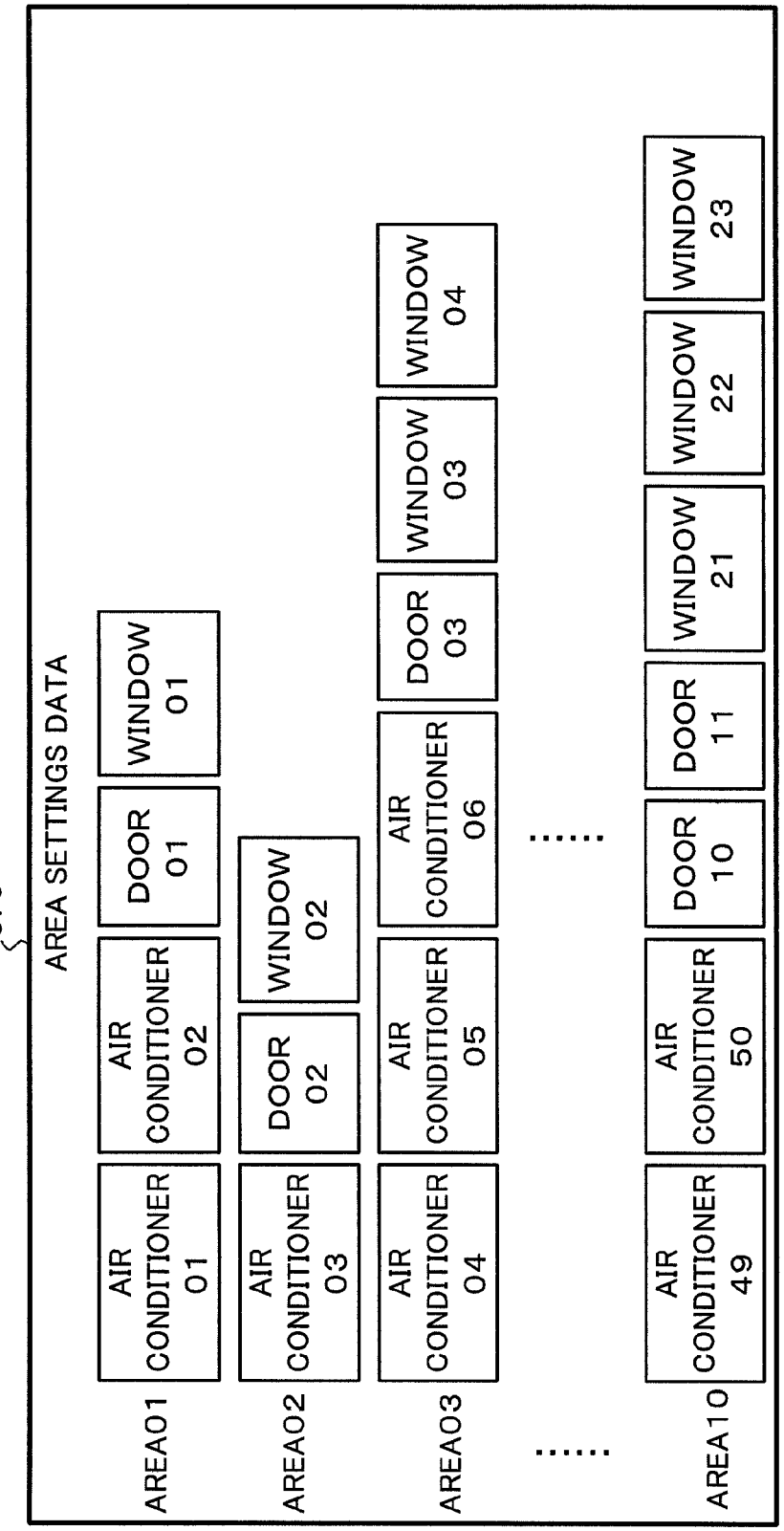
FIG. 2 is a diagram illustrating an example of area settings data stored by the air conditioning management device in FIG. 1.

As illustrated in FIG. 2, the area settings data 370 is data that groups, for each room, air conditioner identification information indicating air conditioners 100 managed by the air conditioning management device 300, and door/window identification information indicating doors and windows on a floor. One set of area information is associated with one room in a building. Note that the area settings data 370 is created by a process of the controller 340 discussed later, and stored in the auxiliary storage 350.

Returning to FIG. 1, the installation position data 380 contains a plan view information 381, an air conditioner installation position information 382, a room area information 383, and a door/window position information 384.

The plan view information 381 is image data indicating a plan view of each floor in a building. This image data may be used by loading an image created on a personal computer or other device into the air conditioning management device 300, but may also be created by the air conditioning management device 300. In the present embodiment, it is assumed that an image created on a personal computer or other device has been loaded in advance and is being stored as the plan view information 381.

The air conditioner installation position information 382 contains building numbers indicating buildings where air conditioners 100 are installed, floor numbers indicating floors where air conditioners 100 are installed, and coordinate (air conditioner installation coordinates) (x-direction, y-direction) data indicating the positions on the plan view expressed by the plan view information 381 where air conditioners 100 are installed.

The room area information 383 contains coordinate group (coordinate groups identifying room areas) (x-direction, y-direction) data indicating the areas on the plan view expressed by the plan view information 381 where rooms exist, and area information identifying areas.

The door/window position information 384 contains coordinate (door/window installation coordinates) (x-direction, y-direction) data indicating the positions on the plan view expressed by the plan view information 381 where doors and windows are installed.

The wasteful operation determination settings data 390 contains threshold values used by a process of the controller 340 to determine whether or not a wasteful operation exists. The threshold values include a temperature threshold value 391 and a wasteful operation counter threshold value 392.

Figure 3:
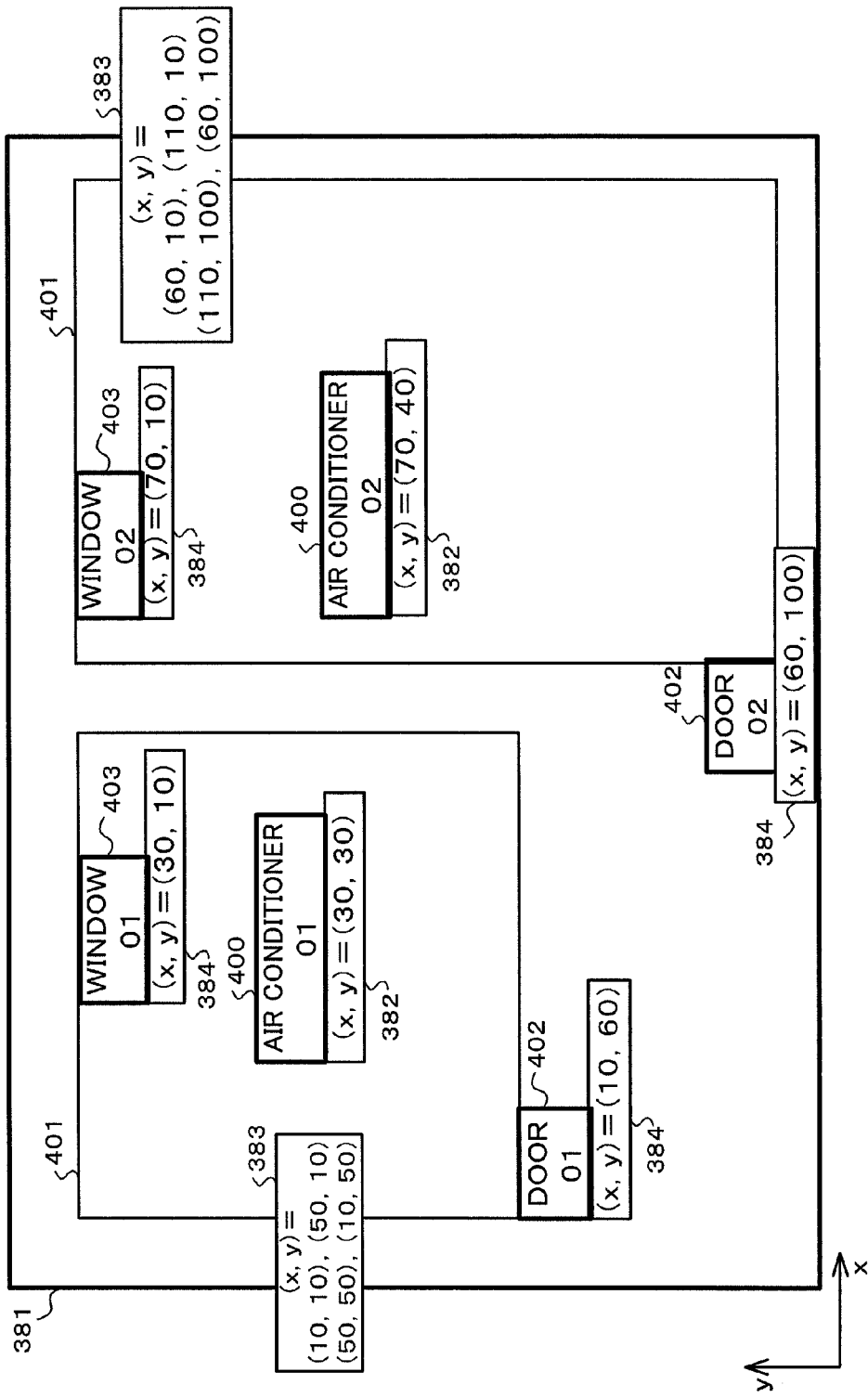
FIG. 3 is a diagram illustrating an example of an air conditioner monitoring screen displayed on a display device provided in the air conditioning management device in FIG. 1.

As illustrated in FIG. 3, the display device 310 displays information such as the operating state of each air conditioner 100 received via the dedicated communication lines 200, on the basis of a process conducted by the controller 340 discussed later. Specifically, the display device 310 displays a plan view of a floor of a building included in the plan view information 381, and on this plan view displays air conditioner icons 400 used to monitor or control air conditioners 100, as well as room area lines 401 indicating room areas, door icons 402, and window icons 403. The display position of each icon is respectively specified by the air conditioner installation position information 382, the room area information 383, or the door/window position information 384.

The air conditioner icons 400 indicate the operating state of each air conditioner 100, such as start/stop and malfunction, with colors or markers. In addition, the display positions of the air conditioner icons 400 are specified by the air conditioner installation position information 382.

The room area lines 401 indicate the areas of rooms on the plan view with solid lines, broken lines, or shading, for example. The display positions of the room area lines 401 are specified by the room area information 383.

The door icons 402 indicate door portions on a floor with colors or markers. The window icons 403 similarly indicate window portions on a floor with colors or markers. Their display positions are specified by the door/window position information 384.

Returning to FIG. 1, the input device 320 includes components such as a touch panel and multiple buttons. In response to the user operating these buttons and the touch panel, the input device 320 transmits user control information indicating the user operations to the controller 340. The user control information at this point includes instructions for switching the monitoring screen or controlling the air conditioners 100, and information on various settings.

The communication manager 330 includes a serial interface, or an analog interface for receiving analog signals. Information transmitted from each air conditioner 100 is received by the communication manager 330, and transmitted to the CPU discussed later via the system bus 399.

The controller 340 includes components such as a CPU. The controller 340 operates according to the air conditioning management program 355, and provides air conditioning management functionality that conducts various processes for controlling and managing the air conditioners 100. The primary functional aspects of the controller 340 provided by the air conditioning management program 355 are an air conditioner controller 341, an area settings deriver 342, a wasteful operation determiner 343, and a wasteful operation notifier 344.

The air conditioner controller 341 controls the air conditioning operation of each air conditioner 100 according to instructions indicated by the user control information input into the input device 320 and the temperature indicated by the indoor temperature information received from each air conditioner 100.

The area settings deriver 342 creates the area settings data 370 illustrated in FIG. 2 on the basis of the air conditioner installation position information 382, room area information 383, and door/window position information 384 stored in advance.

Figure 4:
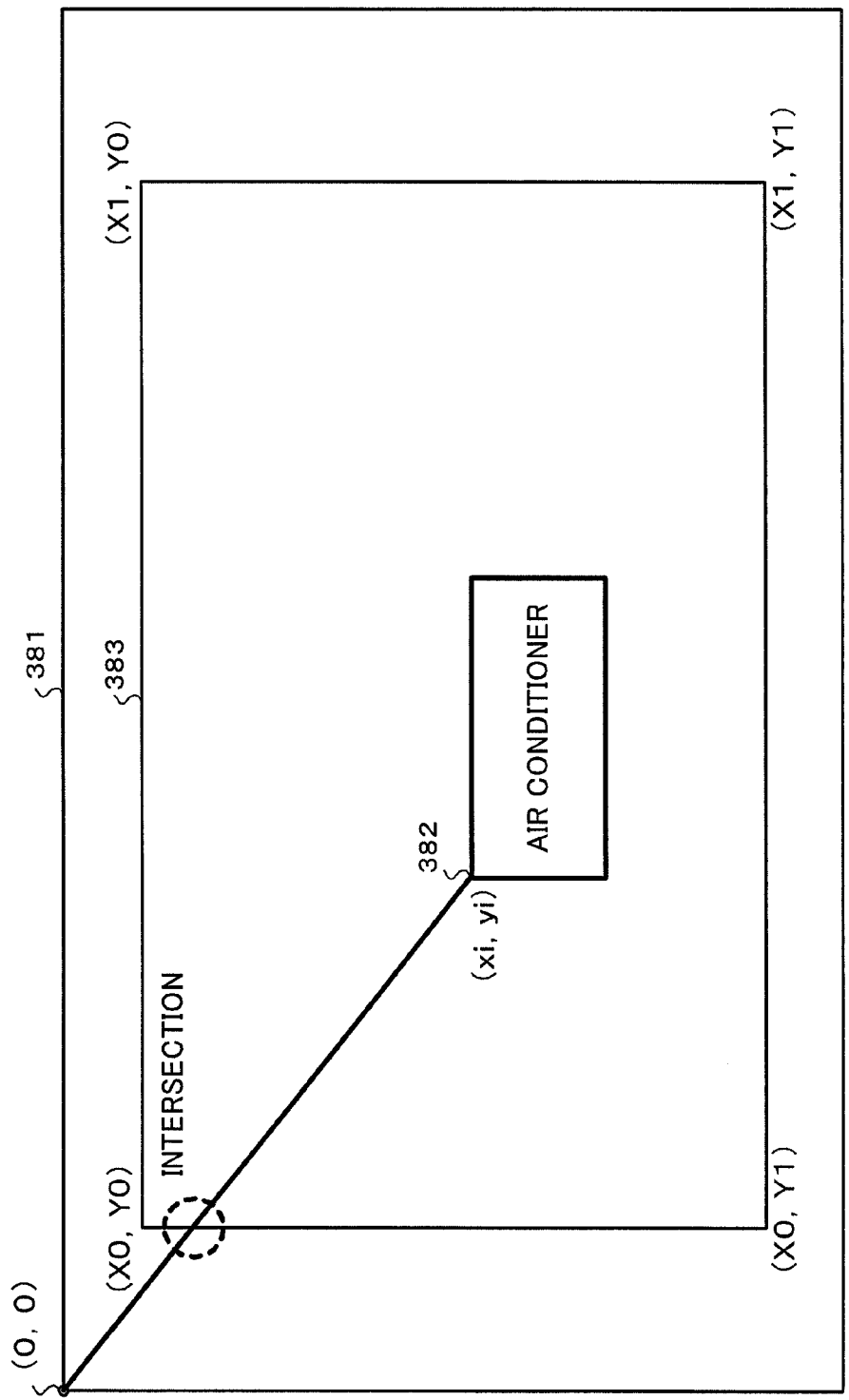
FIG. 4 is a diagram for explaining a technique by which the air conditioning management device in FIG. 1 determines an air conditioner existing in an area.

Specifically, for each area indicated by the room area information 383, the area settings deriver 342 determines the air conditioners 100, doors, and windows installed in that area, and creates area settings data 370 associating these features. The determination is conducted by determining whether or not a line segment joining coordinates indicating a corner position on the plan view expressed by the plan view information 381 ((0, 0), for example) to air conditioner installation position coordinates for an air conditioner 100 corresponding to that floor as indicated by the air conditioner installation position information 382 (($x_i$, $y_i$), for example) intersects with any of the line segments that form the respective areas indicated by the room area information 383 (such as the line segment joining the coordinates ($X_0$, $Y_0$) and ($X_0$, $Y_1$), for example), as illustrated in FIG. 4.

For example, in order to determine whether or not the line segment joining the coordinates (a, b) and (c, d) intersects with the line segment joining the coordinates (A, B) and (C, D), the value s is computed from the equations $a+s(c-a)=A+t(C-A)$ and $b+s(d-b)=B+t(D-B)$, with an intersection being determined if $0<s\leq1$. In the case of determining an intersection, the area settings deriver 342 counts the number thereof (the intersection count) for each area. Then, if the intersection count is an odd number, the area settings deriver 342 determines that air conditioner 100 exists in that area.

In the case of determining whether the air conditioner 100 exists in an area, the area settings deriver 342 associates the air conditioner 100 with the area information corresponding to that area from among the area information indicated by the room area information 383. Similarly, the area settings deriver 342 determines whether or not windows or doors exist in each area indicated by the room area information 383, on the basis of a line segment joining door/window installation coordinates indicated by the door/window position information 384 to a corner position on the plan view expressed by the plan view information 381. Then, in the case of determining whether a door and/or window exists in an area, the area settings deriver 342 associates that door and/or window with the area information indicated by the room area information 383.

The area settings deriver 342 repeats such a process for every air conditioner 100 indicated by the air conditioner installation position information 382 and for every door and window indicated by the door/window position information 384, and creates the area settings data 370 grouped by area as illustrated in FIG. 2. In addition, the area settings deriver 342 stores the created area settings data 370 in the auxiliary storage 350.

Returning to FIG. 1, the wasteful operation determiner 343 determines whether or not a wasteful operation exists for each air conditioner 100, on the basis of the area settings data 370 created by the area settings deriver 342 and the air conditioner operating state data 362. The wasteful operation determiner 343 also estimates the door and/or window causing the wasteful operation as well as its position, on the basis of the area settings data 370, the room area information 383, and the door/window position information 384.

First, the process conducted by the wasteful operation determiner 343 to determine whether or not a wasteful operation exists will be described. The wasteful operation determiner 343 periodically (every 1 minute, for example) acquires operating state data from each air conditioner 100 being managed by the air conditioning management device 300, and registers the acquired data as air conditioner operating state data 362 for each air conditioner 100. The wasteful operation determiner 343 computes the absolute difference between the indoor temperature and the set temperature included in the air conditioner operating state data 362 for each air conditioner 100, and compares the computed absolute difference to the temperature threshold value 391 included in the wasteful operation determination settings data 390.

In the case where the comparison result indicates that the computed absolute difference exceeds the temperature threshold value 391 and the air conditioner operating state data 362 indicates that the relevant air conditioner 100 is in an operating state, the wasteful operation determiner 343 increments a wasteful operation counter (not illustrated) associated with that air conditioner 100. Meanwhile, in the case where the computed absolute difference is less than or equal to the temperature threshold value 391, or where the air conditioner operating state data 362 does not indicate that the relevant air conditioner 100 is in an operating state, the wasteful operation determiner 343 resets the wasteful operation counter (not illustrated) associated with that air conditioner 100 to 0. Note that the wasteful operation counter is set to 0 by default.

The wasteful operation determiner 343 determines whether or not the wasteful operation counter corresponding to the relevant air conditioner 100 has exceeded the wasteful operation counter threshold value 392 included in the wasteful operation determination settings data 390. In the case of determining that the wasteful operation counter threshold value 392 has been exceeded, the wasteful operation determiner 343 then determines that the relevant air conditioner 100 is in a wasteful operating state, and resets the wasteful operation counter to 0. The wasteful operation determiner 343 conducts this process for each air conditioner 100, determining whether or not each air conditioner 100 is in the wasteful operating state by comparing the wasteful operation counter to the wasteful operation counter threshold value 392.

Next, the process in which the wasteful operation determiner 343 estimates the door and/or window causing the wasteful operation as well as its position will be described.

The wasteful operation determiner 343 reads the area settings data 370 created by the area settings deriver 342, and specifies the area information corresponding to the air conditioner identification information indicating an air conditioner 100 determined to be in the wasteful operating state. The wasteful operation determiner 343 then specifies door/window identification information corresponding to the specified area from the same area settings data 370. The wasteful operation determiner 343 reads the air conditioner installation position information 382, and acquires air conditioner installation coordinates corresponding to the air conditioner identification information indicating the air conditioner determined to be in the wasteful operating state. The wasteful operation determiner 343 also reads the door/window position information 384, and from among the multiple coordinates indicating the positions of doors and windows, specifies the coordinates having the shortest distance away from the acquired air conditioner installation coordinates. The wasteful operation determiner 343 infers that the door and/or window positioned at the specified coordinates is the door and/or window causing the wasteful operation, and estimates that the position indicated by the specified coordinates is the position of the door and/or window causing the wasteful operation.

The wasteful operation determiner 343 conducts this process for every air conditioner 100 determined to be in the wasteful operating state, and estimates the doors and windows causing wasteful operation as well as their positions.

On the basis of the air conditioner connection information 361, the wasteful operation notifier 344 notifies the remote control device 110 connected to an air conditioner 100 determined to be in the wasteful operating state by the wasteful operation determiner 343 that wasteful operation is occurring, and indicates the position of the door and/or window causing the wasteful operation.

Specifically, the wasteful operation notifier 344 specifies the orientation in the room (area) where the door and/or window inferred to be causing wasteful operation by the wasteful operation determiner 343 is positioned, on the basis of the coordinates indicating the position of the door and/or window inferred by the wasteful operation determiner 343, as discussed later. The wasteful operation notifier 344 also reads the control group number included in the air conditioner connection information 361, and specifies the remote control device 110 corresponding to the air conditioner identification information indicating the air conditioner 100 determined to be in a wasteful operating state by the wasteful operation determiner 343. The wasteful operation notifier 344 then notifies the specified remote control device 110 that the relevant air conditioner 100 is in a wasteful operating state, and indicates the orientation in the room (area) where the door and/or window causing the wasteful operation is positioned.

The process in which the wasteful operation notifier 344 specifies the orientation in the room (area) where the door and/or window the door and/or window inferred to be causing the wasteful operation by the wasteful operation determiner 343 is positioned will now be described with reference to FIG. 5.

Figure 5:
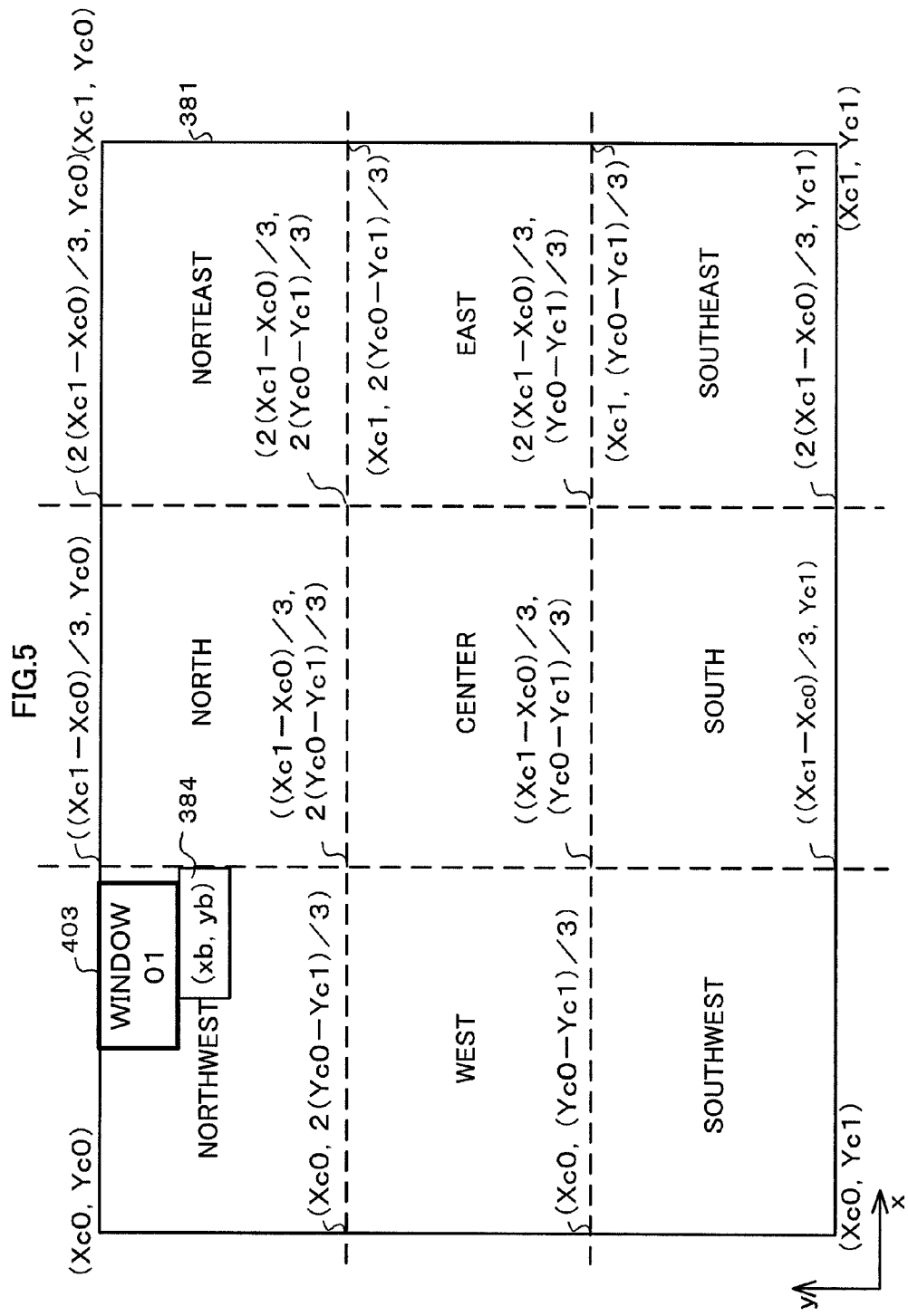
FIG. 5 is a diagram for explaining a technique by which the air conditioning management device in FIG. 1 identifies the position of a door and/or window which potentially causes wasteful operation.

The wasteful operation notifier 344 uses coordinate group data $(X_c, Y_c)$ indicating the area of a room indicated by the room area information 383 to divide the area of the room into nine sections, as illustrated in FIG. 5. This division is conducted by trisecting all line segments indicating the area of the room. The wasteful operation notifier 344 assigns labels to each subdivision. The labels may be names indicating compass directions as illustrated in FIG. 5, but may also be sequential numbers. The wasteful operation notifier 344 also computes the coordinates at a corner of each subdivision.

The wasteful operation notifier 344 specifies which of the subdivisions contains the coordinate data (xb, yb) of the door and/or window inferred to be causing the wasteful operation by the wasteful operation determiner 343. This specification involves successively comparing the coordinate data of the door and/or window to the coordinates of the corner of each subdivision, and determining for each subdivision whether or not the coordinate data of the door and/or window is contained in that subdivision. The wasteful operation notifier 344 conducts this process for each door and/or window inferred to be causing the wasteful operation by the wasteful operation determiner 343, and specifies the orientation in the room (area) where a door and/or window causing the wasteful operation is positioned.

The wasteful operation notifier 344 acquires the label assigned to the specified area, and includes that label in the content of the notification issued to the remote control device 110 as cause position information. The wasteful operation notifier 344 then generates wasteful operation occurrence information indicating that wasteful operation is occurring, and includes this information in the content of the notification issued to the remote control device 110. The wasteful operation notifier 344 notifies the specified remote control device 110 of the notification content containing the wasteful operation occurrence information indicating that wasteful operation is occurring, and the cause position information indicating the position of the door and/or window causing the wasteful operation.

The foregoing is a configuration of the air conditioning management device 300 according to the present embodiment.

Next, operation of the air conditioning management device 300 in the air conditioning management system 10 will be described with reference to FIGS. 6 to 9.

Figure 6:
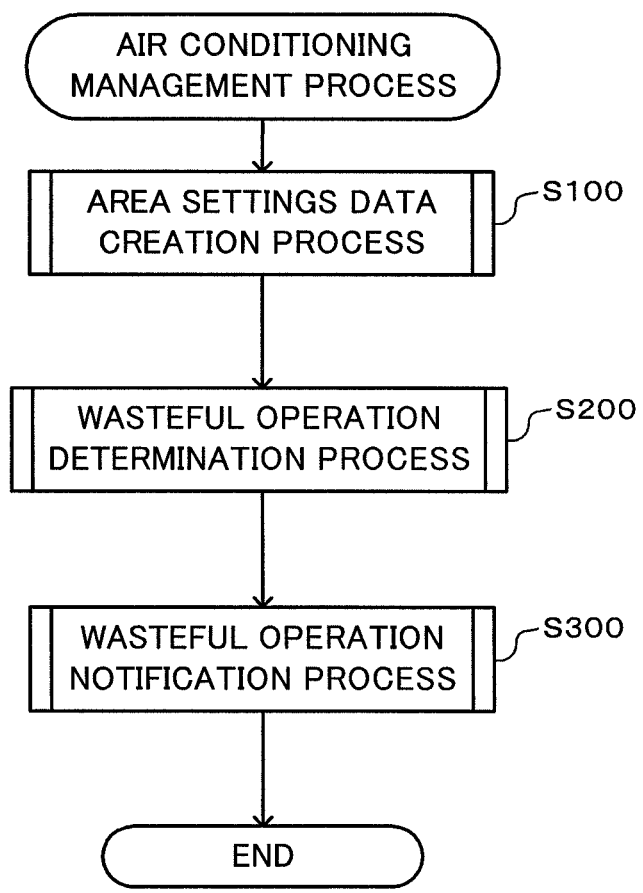
FIG. 6 is a flowchart illustrating a sequence of an air conditioning management process executed by the air conditioning management device in FIG. 1.

As illustrated in FIG. 6, the air conditioning management process in the air conditioning management device 300 includes an area settings data creation process that creates the area settings data 370, a wasteful operation determination process that determines whether or not a wasteful operating state exists, and a wasteful operation notification process that issues a notification indicating a wasteful operating state and the position of the door and/or window inferred to be the cause thereof. In the air conditioning management process, the area settings data creation process is conducted first (step S100), and then the wasteful operation determination process (step S200) and the wasteful operation notification process (step S300) are executed in that order, as illustrated in FIG. 6.

Figure 7:
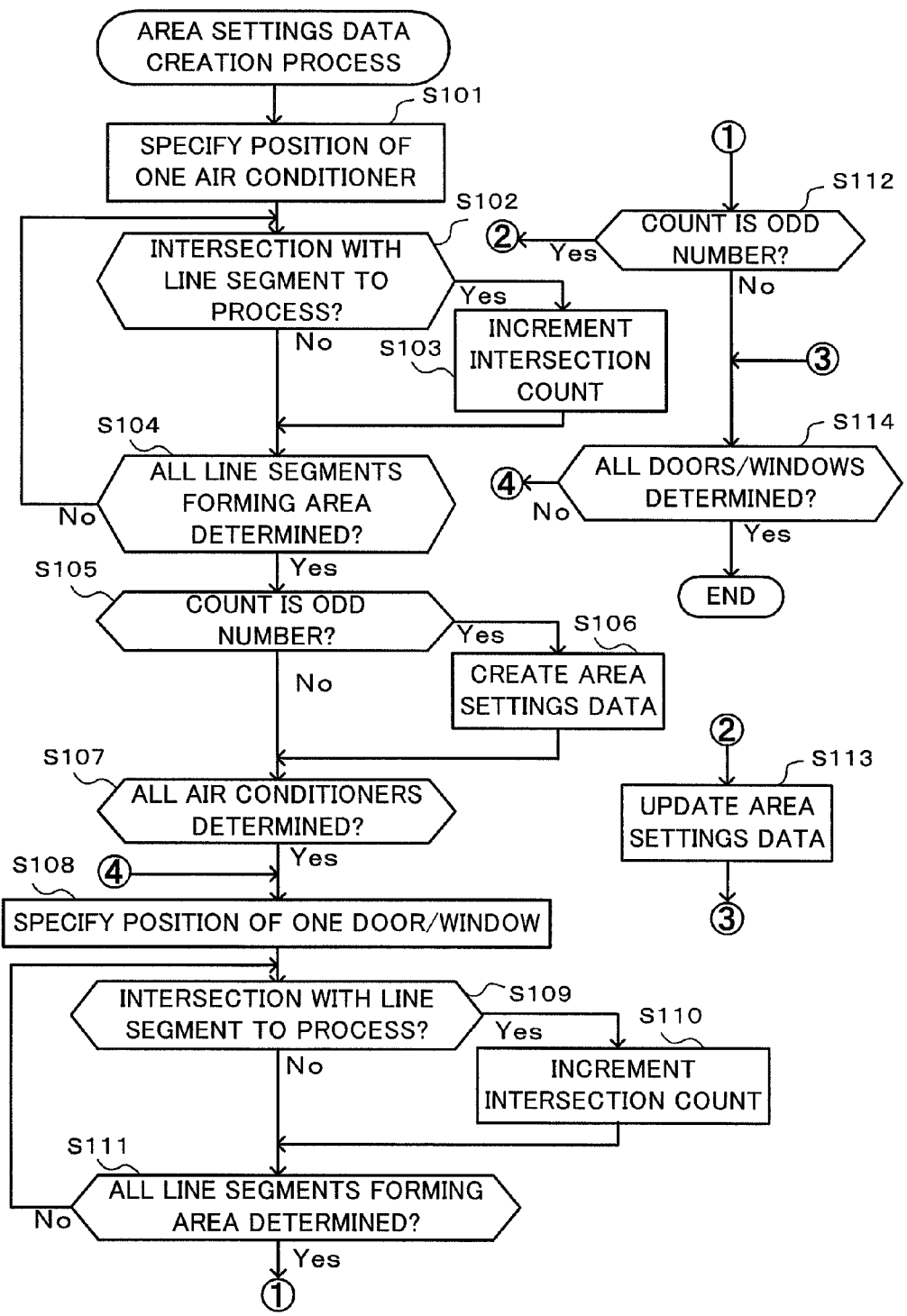
FIG. 7 is a flowchart illustrating a sequence of an area settings data creation process executed by the air conditioning management device in FIG. 1.

First, the area settings data creation process will be described with reference to FIG. 7. The area settings data creation process is initiated due to a user input operation registering or updating all or part of the plan view information 381, the air conditioner installation position information 382, the room area information 383, and the door/window position information 384.

The air conditioning management device 300 functions as the area settings deriver 342 to read the air conditioner installation position information 382 and specify the coordinates of an unprocessed air conditioner 100 from among the a plurality of air conditioners 100 (step S101). The air conditioning management device 300 determines whether or not a line segment joining the coordinates indicating a corner position on the plan view expressed by the plan view information 381 to the air conditioner installation position coordinates of the specified air conditioner 100 intersects with an unprocessed line segment from among the four line segments forming the area indicated by the room area information 383 (step S102).

In the case of determining an intersection (step S102; Yes), the air conditioning management device 300 increments the intersection count (step S103). Meanwhile, in the case of determining a non-intersection (step S102; No), the air conditioning management device 300 does not conduct any particular processing.

Subsequently, the air conditioning management device 300 determines whether or not all line segments forming the area have been determined (step S104). In the case where it is not determined that all line segments have been determined (step S104; No), the air conditioning management device 300 returns to step S102 and repeats the above operation.

Meanwhile, in the case of determining that all line segments have been determined (step S104; Yes), the air conditioning management device 300 determines whether or not the incremented intersection count is an odd number (step S105). In the case of determining that the intersection count is an odd number (step S105; Yes), the air conditioning management device 300 creates area settings data 370 associating the area information indicated by the room area information 383 with the relevant air conditioner 100 (step S106). Meanwhile, in the case of determining that the intersection count is not an odd number (step S105; No), the air conditioning management device 300 does not conduct any particular processing.

The air conditioning management device 300 determines whether or not the above operations have been conducted for all air conditioners 100 indicated by the air conditioner installation position information 382 (step S107). In the case of not determining that these operations have been conducted for all air conditioners 100 (step S107; No), the air conditioning management device 300 returns to step S101, specifies the coordinates of another unprocessed air conditioner 100, and repeats these operations.

Meanwhile, in the case of determining that the above operations have been conducted for all air conditioners 100 (step S107; Yes), the air conditioning management device 300 reads the door/window position information 384 and specifies the coordinates of an unprocessed door and/or window from among the multiple doors and windows (step S108). The air conditioning management device 300 determines whether or not a line segment joining the coordinates indicating a corner position on the plan view expressed by the plan view information 381 to the specified door and/or window intersects with an unprocessed line segment from among the four line segments forming the area indicated by the room area information 383 (step S109).

In the case of determining an intersection (step S109; Yes), the air conditioning management device 300 increments the intersection count (step S110). Meanwhile, in the case of determining a non-intersection (step S109; No), the air conditioning management device 300 does not conduct any particular processing.

Subsequently, the air conditioning management device 300 determines whether or not all line segments forming the area have been determined (step S111). In the case of determining that all line segments have been determined (step S111; Yes), the air conditioning management device 300 determines whether or not the incremented intersection count is an odd number (step S112). In the case of determining that the intersection count is an odd number (step S112; Yes), the air conditioning management device 300 associates the relevant door and/or window with the area information indicated by the room area information 383, and updates the area settings data 370 created in step S106 (step S113).

The air conditioning management device 300 determines whether or not the above operations have been conducted for all doors and windows indicated by the door/window position information 384 (step S114). In the case of determining that the above operations have been conducted for all doors and windows (step S114; Yes), the air conditioning management device 300 ends the area settings data creation process.

Meanwhile, in the case of not determining that the above operations have been conducted for all doors and windows (step S114; No), the air conditioning management device 300 returns to step S108, specifies the coordinates of another door and/or window, and repeats these operations.

Figure 8:
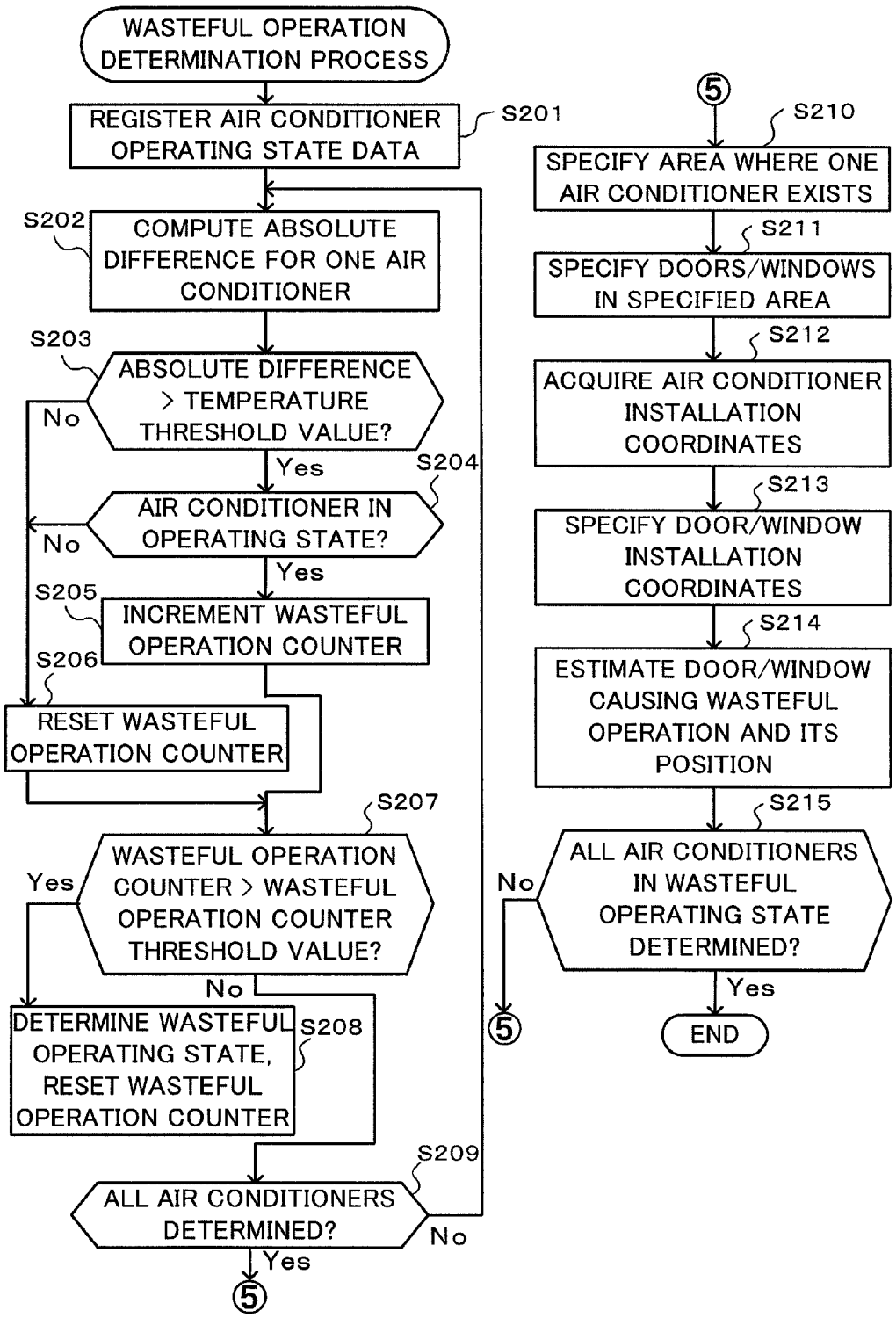
FIG. 8 is a flowchart illustrating a sequence of a wasteful operation determination process executed by the air conditioning management device in FIG. 1.

Next, the wasteful operation determination process will be described with reference to FIG. 8. The wasteful operation determination process is initiated every time a given amount of time elapses after the area settings data 370 is created by the area settings data creation process, according to an internal timer (not illustrated).

The air conditioning management device 300 functions as the wasteful operation determiner 343 to acquire operating state data from each air conditioner 100, and registers the acquired data as the air conditioner operating state data 362 (step S201).

Subsequently, the air conditioning management device 300 computes the absolute difference between an indoor temperature and a set temperature respectively included in the air conditioner operating state data 362 for an unprocessed air conditioner from among the a plurality of air conditioners 100 (step S202). The computed value is then compared against the temperature threshold value 391 included in the wasteful operation determination settings data 390 (step S203).

In the case where the computed absolute difference exceeds the temperature threshold value 391 (step S203;

Yes) and where the air conditioner operating state data 362 indicates that the relevant air conditioner 100 is in an operating state (step S204; Yes), the air conditioning management device 300 increments the wasteful operation counter (step S205).

Meanwhile, in the case where the computed absolute difference is less than or equal to the temperature threshold value 391, or where the air conditioner operating state data 362 does not indicate that the relevant air conditioner 100 is in an operating state (step S204; No), the air conditioning management device 300 resets the wasteful operation counter to 0 (step S206).

Next, the air conditioning management device 300 determines whether or not the wasteful operation counter exceeds the wasteful operation counter threshold value 392 (step S207). Then, in the case of determining that the wasteful operation counter exceeds the wasteful operation counter threshold value 392 (step S207; Yes), the air conditioning management device 300 determines that the relevant air conditioner 100 is in a wasteful operating state, and resets the wasteful operation counter to 0 (step S208).

Next, the air conditioning management device 300 determines whether or not the above operations have been conducted on all air conditioners 100 indicated by the air conditioner installation position information 382 (step S209). In the case of not determining that the above operations have been conducted on all air conditioners 100 (step S209; No), the air conditioning management device 300 returns to step S202 and repeats the above operations for another air conditioner 100.

Meanwhile, in the case of determining that the above operations have been conducted for all air conditioners 100 (step S209; Yes), the air conditioning management device 300 reads the area settings data 370 and specifies the area where one air conditioner 100 exists from among the one or multiple air conditioners 100 determined to be in a wasteful operating state (step S210).

The air conditioning management device 300 then specifies doors and windows existing in the specified area from the same area settings data 370 (step S211), and acquires air conditioner installation coordinates on the basis of the air conditioner installation position information 382 (step S212). The air conditioning management device 300 reads the door/window position information 384, and specifies the door/window installation coordinates having the shortest distance away from the acquired air conditioner installation coordinates (step S213).

The air conditioning management device 300 infers that the door and/or window positioned at the specified door/window installation coordinates is the door and/or window causing the wasteful operation, and specifies the position indicated by those coordinates as the position of the door and/or window causing the wasteful operation (step S214).

The air conditioning management device 300 determines whether or not the above operations have been conducted for all air conditioners 100 that were determined to be in a wasteful operating state in step S208 (step S215). In the case of not determining that the above operations have been conducted for all air conditioners 100 (step S215; No), the air conditioning management device 300 returns to step S210 and repeats the above operations for another air conditioner 100 in the wasteful operating state.

Meanwhile, in the case of determining that the above operations have been conducted for all air conditioners 100 that were determined to be in a wasteful operating state in step S208 (step S215; Yes), the air conditioning management device 300 ends the wasteful operation determination process.

Figure 9:
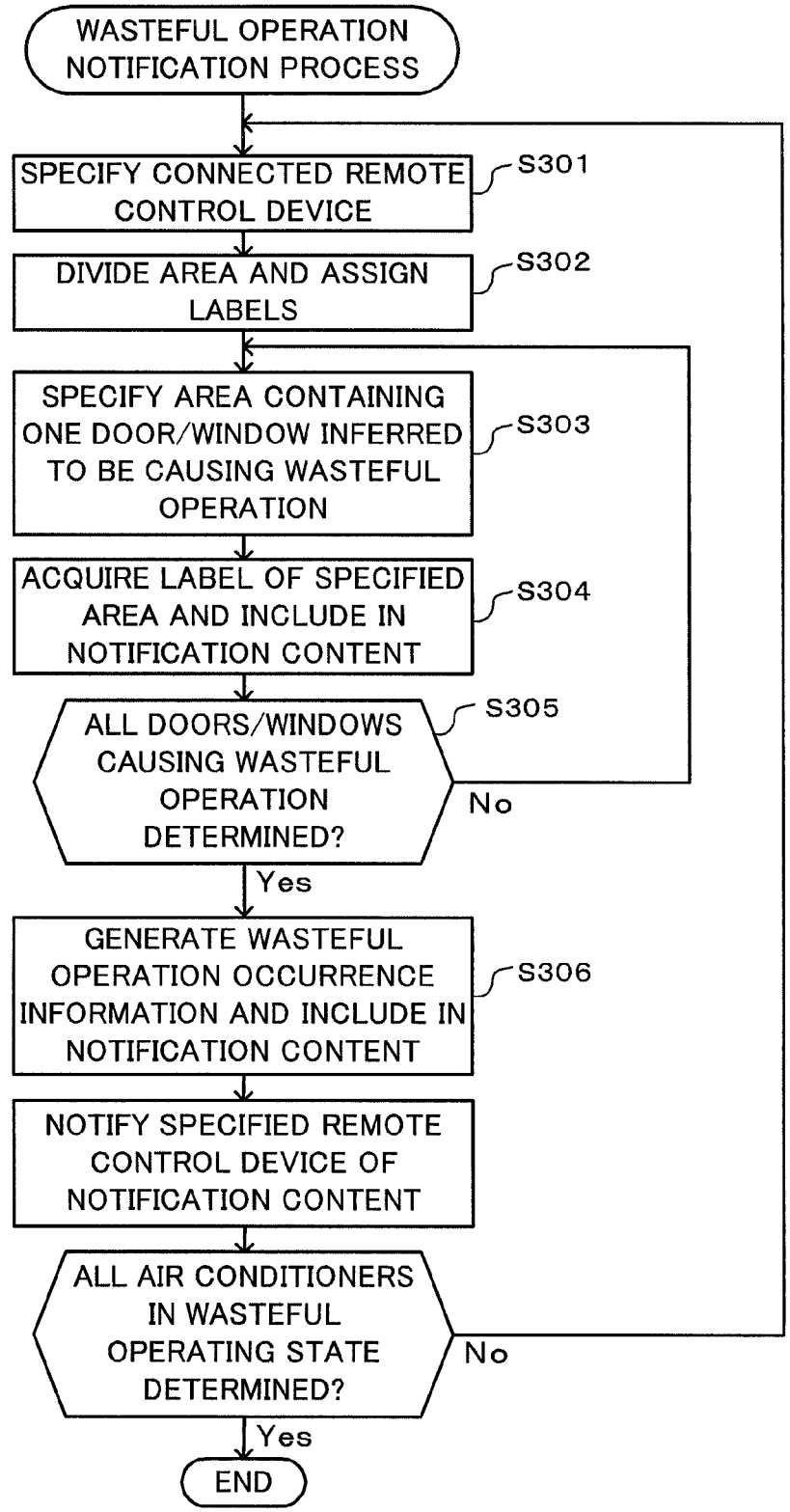
FIG. 9 is a flowchart illustrating a sequence of a wasteful operation notification process executed by the air conditioning management device in FIG. 1.

Subsequently, the wasteful operation notification process will be described with reference to FIG. 9. The wasteful operation notification process is initiated following the end of the wasteful operation determination process, every time the wasteful operation determination process determines that there is an air conditioner in the wasteful operating state.

The air conditioning management device 300 functions as the wasteful operation notifier 344 to read the control group number included in the air conditioner connection information 361, and specify the remote control device 110 connected to one air conditioner 100 from among the one or multiple air conditioners 100 determined to be in a wasteful operating state by the wasteful operation determination process (step S301).

The air conditioning management device 300 uses coordinate group data ($X_c$, $Y_c$) indicating the area of a room indicated by the room area information 383 to subdivide the area of the room and assign labels to the subdivisions (step S302).

The air conditioning management device 300 determines which subdivision contains the coordinate data for one door and/or window among the one or multiple doors or windows inferred to be causing the wasteful operation by the wasteful operation determination process (step S303). Subsequently, the air conditioning management device 300 acquires the label assigned to the specified area, and includes that label in the content of the notification issued to the remote control device 110 as cause position information (step S304).

The air conditioning management device 300 determines whether or not the above operations have been conducted for all doors and windows inferred to be causing the wasteful operation by the wasteful operation determination process (step S305). In the case of not determining that the above operations have been conducted for all doors and windows (step S305; No), the air conditioning management device 300 returns to step S303 and executes the above operations for another door and/or window. Meanwhile, in the case of determining that the above operations have been conducted for all doors and windows (step S305; Yes), the air conditioning management device 300 generates wasteful operation occurrence information indicating that the wasteful operation is occurring, and includes the generated information in the notification content (step S306).

The air conditioning management device 300 then notifies the remote control device 110 specified in step S301 of the notification content containing the wasteful operation occurrence information and the cause position information (step S307). Thus, the remote control device 110 presents the notification content to the user.

The air conditioning management device 300 determines whether or not the above operations have been conducted for all air conditioners 100 determined to be in a wasteful operating state by the wasteful operation determination process (step S308). In the case of not determining that above operations have been conducted for all air conditioners 100 (step S308; No), the air conditioning management device 300 returns to step S301 and executes the above operations for another air conditioner 100 in a wasteful operating state. Meanwhile, in the case of determining that the above operations have been conducted for all air conditioners 100 in a wasteful operating state (step S308; Yes), the air conditioning management device 300 ends the wasteful operation notification process.

The foregoing is the operation of an air conditioning management system 10 centered on the operation of the air conditioning management device 300.

In this way, an air conditioning management device 500 according to the present embodiment analyzes plan view information 381 stored in auxiliary storage 350, and generates room area information 383 and door/window position information 384. The generated room area information 383 and door/window position information 384 is then stored in the auxiliary storage 350. Consequently, according to the air conditioning management device 500 it is possible to contribute to quick resolution of the wasteful operation and promote power efficiency, while in addition reducing the user workload of registering various information. Also, since corresponding room area information 383 and door/window position information 384 is generated even in the case where the plan view information 381 is modified, it is also possible to reduce user burden during updates.

Furthermore, according to the air conditioning management device 300, the door and/or window causing wasteful operation is estimated, and a notification indicating that position and the wasteful operation is issued to the remote control device 110 associated with the relevant air conditioner 100. Thus, it is possible to notify the user of a wasteful operating state as well as the orientation in the room where the door and/or window determined to be causing the wasteful operation is positioned. Consequently, it is possible to contribute to quick resolution of wasteful operation and promote power efficiency. Moreover, it is possible to make the user more mindful about preventing wasteful operation. Also, even in the case where the air conditioner installation position information 382, the room area information 383, or the door/window position information 384 changes, the area settings data 370 is automatically recreated, thus making it possible to prevent malfunctions.

Embodiment 2

Although the foregoing Embodiment 1 illustrates an example of storing the room area information 383 and the door/window position information 384 in the auxiliary storage 350 in advance, this information is registered from the input device 320 by the initial setup worker. For this reason, on sites such as buildings with many floors, there is a possibility of a large increase in the workload of registering this information.

Thus, in order to reduce the workload of registering various information, an air conditioning management device according to the present embodiment is equipped with information generation functionality that generates the room area information 383 and the door/window position information 384 on the basis of plan view information 381 registered in advance, in addition to the air conditioning management functionality according to Embodiment 1.

Figure 10:
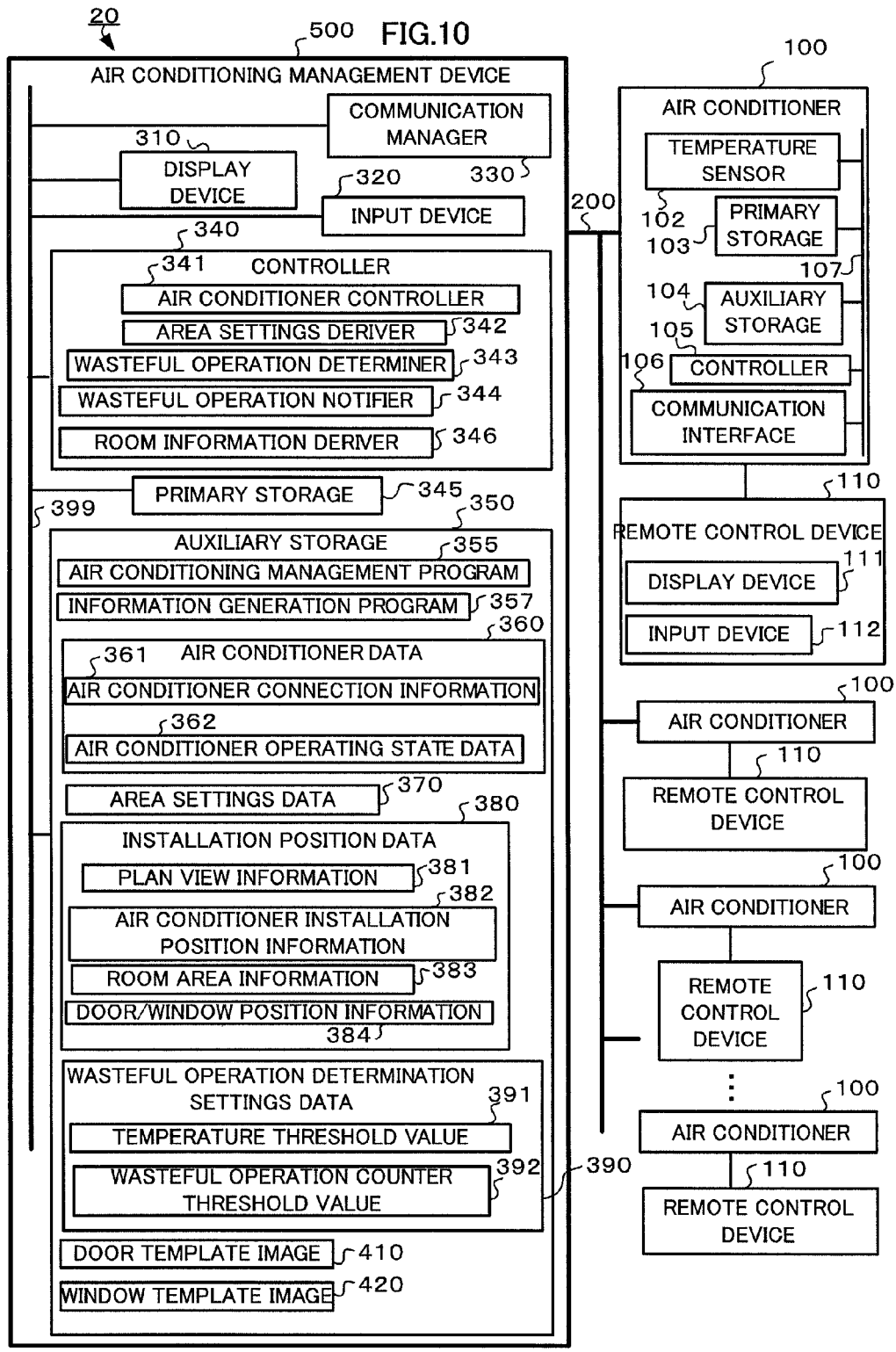
FIG. 10 is a block diagram illustrating a configuration of an air conditioning management system centered on an air conditioning management device according to Embodiment 2 of the present invention.

As illustrated in FIG. 10, in addition to the configuration of Embodiment 1, the auxiliary storage 350 of an air conditioning management device 500 also stores an information generation program 357, a door template image 410, and a window template image 420. Also, in addition to the configuration of Embodiment 1, the primary functional aspect of the air conditioning management device 500 provided by the information generation program 357 is a room information deriver 346. Note that other than the air conditioning management device 500 included in the air conditioning management system 20, the configuration is similar to Embodiment 1.

The information generation program 357 is a program stating a series of operations for realizing information generation functionality.

The door template image 410 is an image depicting a door, while the window template image 420 is an image depicting a window.

The room information deriver 346 analyzes the plan view information 381 stored in the auxiliary storage 350 to generate room area information 383 and the door/window position information 384, and stores the generated information in the auxiliary storage 350.

The process of generating the room area information 383 will be described. The room information deriver 346 analyzes the color of a plan view image for each floor expressed by the plan view information 381 in units of pixels, and recognizes a color being frequently used as the background color. At this point, it is assumed that the color being used the most is recognized as the background color. The room information deriver 346 then separates the plan view image into rows and columns, and analyzes hues.

Specifically, the room area information 383 determines whether or not the distance between the hue of a pixel to be determined and the hue of the background color is equal to or greater than a threshold value stored in the auxiliary storage 350 in advance, and also whether or not the hue is continuous. The room area information 383 then extracts pixels whose hues are determined to be equal to or greater than the threshold value and also continuous, and specifies the extracted pixels as the pixels of the boundary lines indicating room areas. For example, provided that the hue of a pixel to be determined is (R, G, B) and that the hue of the background color pixels is ($R_0$, $G_0$, $B_0$), the distance therebetween is computed as $((R-R_0)^2+(G-G_0)^2+(B-B_0)^2)^{1/2}$. The room information deriver 346 conducts this process in units of rows and columns on the plan view, and respectively identifies horizontal boundary lines and vertical boundary lines. The room information deriver 346 then determines the areas enclosed by the identified horizontal and vertical boundary lines to be rooms.

The room information deriver 346 determines the coordinates of pixels identified as both a vertical boundary line and a horizontal boundary line to be the vertex coordinates of the room. The room information deriver 346 then takes given vertex coordinates (X0, Y0, for example) as a starting point (reference coordinates), and selects the neighboring vertex coordinates in the x-direction (X1, Y0, for example), as in the example illustrated in FIG. 11. Taking the selected vertex coordinates as a starting point, the neighboring vertex coordinates in the y-direction (X1, Y1, for example) are then selected. The room information deriver 346 then takes the selected vertex coordinates as a starting point, and selects the neighboring vertex coordinates in the x-direction and in the direction of the reference coordinates (X2, Y1, for example). Taking the selected vertex coordinates as a starting point, the neighboring vertex coordinates in the y-direction and in the direction of the reference coordinates (X2, Y2, for example) are then selected. Every time vertex coordinates are selected, the room information deriver 346 determines whether or not the selected vertex coordinates match the reference coordinates, and in the case of determining that the coordinates do match, the vertex coordinate group selected up to that point are sequentially registered in the room area information 383. Meanwhile, in the case of determining that the selected vertex coordinates do not match the reference coordinates, the room information deriver 346 repeats the selection of vertex coordinates.

Figure 11:
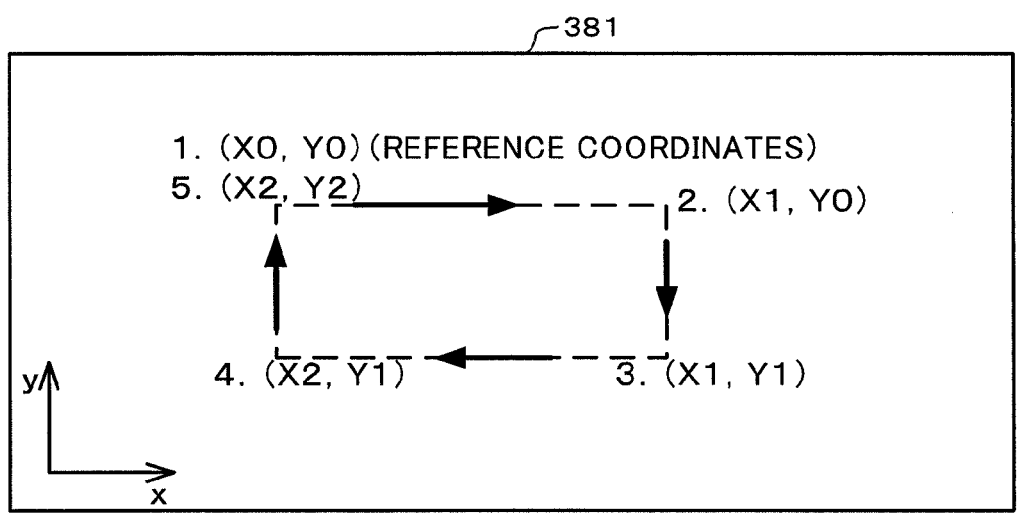
FIG. 11 is a diagram for explaining a technique by which the air conditioning management device in FIG. 10 generates room area information.

At this point, since the vertex coordinates (X2, Y2) are equal to the reference coordinates (X0, Y0) in the example illustrated in FIG. 11, the room information deriver 346 sequentially registers the vertex coordinates selected up to that point ((X0, Y0), (X1, Y0), (X1, Y1), (X0, Y1)) in the room area information 383.

The room information deriver 346 generates the room area information 383 by conducting the above process for each plan view on every floor expressed by the plan view information 381.

Next, the process of generating the door/window position information 384 will be described. The room information deriver 346 generates the door/window position information 384 by using template matching, for example. The room information deriver 346 reads image data for a plan view of a floor expressed by the plan view information 381, and taking a given pixel ((0, 0, for example) as a starting point, cuts out an image of equal size to the door template image 410. The room information deriver 346 then compares the cutout image to the door template image 410.

Comparing a cutout image to the door template image 410 will now be described. The room information deriver 346 respectively extracts the pixels in the cutout image and their corresponding pixels in the door template image 410, compares their hues, and determines whether or not the hues are close by at least a given degree. The determination is conducted using a threshold value stored in the auxiliary storage 350 in advance. For example, provided that the hue of a pixel in the door template image 410 is (R0, G0, B0) and the hue of a pixel to be determined is (R, G, B), the room information deriver 346 determines that the hues are close by at least the given degree in the case where the value computed by $((R-R_0)^2+(G-G_0)^2+(B-B_0)^2)^{1/2}$ is less than the threshold value. In the case of determining that the hues are close by at least the given degree, the room information deriver 346 increments a match counter not illustrated. Note that the match counter is set to 0 by default.

The room information deriver 346 conducts this process on each pixel in the cutout image. The match counter is then compared to a threshold value stored in the auxiliary storage 350 in advance, and in the case of determining that the value indicated by the match counter has exceeded the threshold value, the room information deriver 346 determines that the cutout image depicts a door. The room information deriver 346 then resets the match counter, and registers the coordinates of the given pixel as door/window position information 384.

Likewise for windows, the room information deriver 346 reads image data for a plan view of a floor expressed by the plan view information 381, cuts out an image of equal size to the window template image 420 while taking a given pixel ((0, 0, for example)) as a starting point, and compares the cutout image to the window template image 420. Then, in the case of determining that the match counter has exceeded a threshold value, the room information deriver 346 determines that the cutout image depicts a window, and registers the coordinates of the given pixel as door/window position information 384.

The room information deriver 346 executes the processes described above on each pixel in the image data expressed by the plan view information 381 to generate the door/window position information 384.

The foregoing is a configuration of an air conditioning management device 500 according to the present embodiment.

Figure 12:
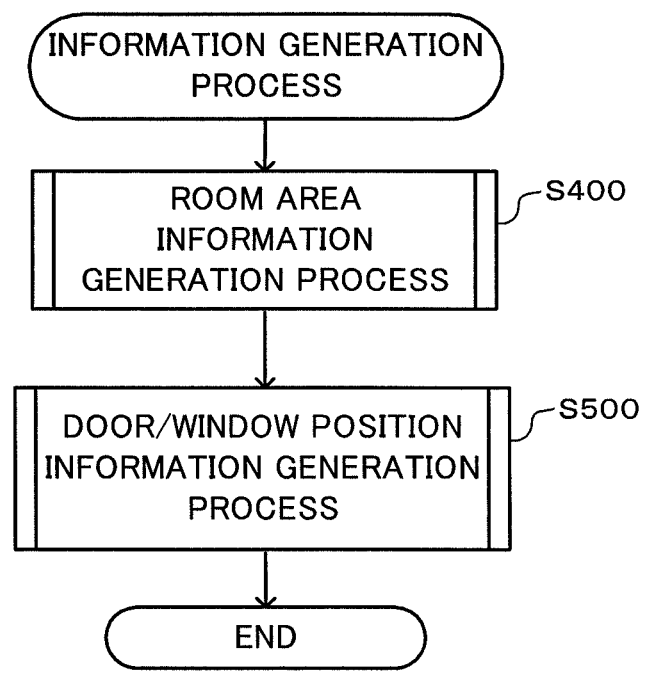
FIG. 12 is a flowchart illustrating a sequence of an information generation process executed by the air conditioning management device in FIG. 10.

Next, operation of the air conditioning management device 500 in the air conditioning management system 20 will be described with reference to FIGS. 12 to 14. Note that since the air conditioning management process in the air conditioning management device 500 is similar to that of the earlier Embodiment 1, the information generation process will be described herein.

The information generation process is initiated due to a user input operation registering or updating the plan view information 381. As illustrated in FIG. 12, the information generation process includes a room area information generation process that generates the room area information 383 (step S400) and a door/window position information generation process that generates the door/window position information 384 (step S500), which are executed in the illustrated order.

First, the room area information generation process will be described with reference to FIG. 13. The room area information generation process is initiated due to a user input operation registering or updating all or part of the plan view information 381 and the air conditioner installation position information 382.

The air conditioning management device 500 functions as the room information deriver 346 to analyze, in units of pixels, the colors of plan view images for each floor expressed by the plan view information 381, and recognize the most-used color as the background color (step S401).

The air conditioning management device 500 then computes the distance between the hue of a pixel to be determined in a plan view image, and the hue of the background color (step S402).

The air conditioning management device 500 compares the computed distance to a threshold value (step S403), and in the case where the computed distance is equal to or greater than the threshold value (step S403; Yes), determines whether or not that hue is continuous (step S404). In the case of determining that the hue is continuous (step S404; Yes), the air conditioning management device 500 identifies that pixel as a pixel of a boundary line indicating the area of a room (step S405). Meanwhile, in the case where the computed distance is less than the threshold value (step S403; No) or in the case of determining that the hue is not continuous (step S404; No), the air conditioning management device 500 does not conduct any particular processing.

The air conditioning management device 500 conducts this process in units of rows and columns, and identifies horizontal and vertical boundary lines (step S406). The air conditioning management device 500 then determines if this process has been conducted on all rows and columns in the plan view (step S407). In the case of determining that the process has been conducted on all rows and columns (step S407; Yes), the air conditioning management device 500 determines areas enclosed by the identified horizontal and vertical boundary lines to be rooms (step S408). Meanwhile, in the case of not determining that the process has been conducted on all rows and columns (step S407; No), the air conditioning management device 500 returns to step S402 and conducts the process on a pixel in another row or column.

Next, the air conditioning management device 500 specifies the coordinates of pixels identified as both a vertical boundary line and a horizontal boundary line to be the vertex coordinates of the room (step S409), and sequentially selects neighboring vertex coordinates while taking reference coordinates as a starting point (step S410). The air conditioning management device 500 then compares the selected vertex coordinates to the reference coordinates (step S411), and if the coordinates match (step S411; Yes), sequentially registers the vertex coordinate group selected up to that point in the room area information 383 (step S412). Meanwhile, in the case where the coordinates do not match (step S411; No), the air conditioning management device 500 returns to step S410 and repeats the process.

The air conditioning management device 500 determines whether or not the process has been conducted on the plan view for each floor indicated by the plan view information 381 (step S413). In the case of determining that the process has been conducted on the plan view for each floor (step S413; Yes), the air conditioning management device 500 stores the room area information 383 in the auxiliary storage 350 and ends the room area information generation process. Meanwhile, in the case of not determining that the process has been conducted on the plan view for each floor (step S413; No), the air conditioning management device 500 returns to step S401 and executes the process on a plan view for another floor.

Next, the door/window position information generation process will be described using FIG. 14. The door/window position information generation process is initiated following the room area information generation process.

The air conditioning management device 500 functions as the room information deriver 346 to cut out an image of equal size to the door template image 410 from the image data of the plan view expressed by the plan view information 381 (step S501).

The air conditioning management device 500 compares a pixel in the cutout image to a pixel in the door template image 410, and determines whether or not their hues are close by at least a given degree (step S502). In the case of determining that the hues are close by the given degree (step S502; Yes), the air conditioning management device 500 increments a match counter (step S503). Meanwhile, in the case of not determining that the hues are close by the given degree (step S502; No), the air conditioning management device 500 does not conduct any particular processing.

The air conditioning management device 500 determines whether or not every pixel in the cutout image has been processed in step S502 (step S504). In the case of determining that not every pixel has been processed (step S504; No), the air conditioning management device 500 returns to step S502 and processes another pixel. Meanwhile, in the case of determining that every pixel has been processed in step S502 (step S504; Yes), the air conditioning management device 500 compares the match counter to a threshold value (step S505).

In the case where the value indicated by the match counter exceeds the threshold value (step S505; Yes), the air conditioning management device 500 resets the match counter and registers the coordinates of a given pixel contained in the cutout image as door/window position information 384 (step S506). Meanwhile, in the case where the value indicated by the match counter is less than or equal to the threshold value (step S505; No), the air conditioning management device 500 resets the match counter (step S507).

Subsequently, the air conditioning management device 500 determines whether or not every pixel in the image data has been processed (step S508). In the case of determining that not every pixel in the image data has been processed (step S508; No), the air conditioning management device 500 returns to step S501 and processes another pixel in the image data. Meanwhile, in the case of determining that every pixel in the image data has been processed (step S508; Yes), the air conditioning management device 500 cuts out an image of equal size to the window template image 420 from the image data for a plan view expressed by the plan view information 381 (step S509).

The air conditioning management device 500 compares a pixel in the cutout image to a pixel in the window template image 420, and determines whether or not their hues are close by at least a given degree (step S510). In the case of determining that the hues are close by the given degree (step S510; Yes), the air conditioning management device 500 increments a match counter (step S511). Meanwhile, in the case of not determining that the hues are close by the given degree (step S510; No), the air conditioning management device 500 does not conduct any particular processing.

The air conditioning management device 500 determines whether or not every pixel in the cutout image has been processed in step S510 (step S512). In the case of determining that not every pixel has been processed (step S512; No), the air conditioning management device 500 returns to step S510 and processes another pixel. Meanwhile, in the case of determining that every pixel has been processed in step S510 (step S512; Yes), the air conditioning management device 500 compares the match counter to a threshold value (step S513).

In the case where the value indicated by the match counter exceeds the threshold value (step S513: Yes), the air conditioning management device 500 resets the match counter and registers the coordinates of a given pixel contained in the cutout image as door/window position information 384 (step S514). Meanwhile, in the case where the value indicated by the match counter is less than or equal to the threshold value (step S513; No), the air conditioning management device 500 resets the match counter (step S515).

Subsequently, the air conditioning management device 500 determines whether or not every pixel in the image data has been processed (step S516). In the case of determining that not every pixel in the image data has been processed (step S516; No), the air conditioning management device 500 returns to step S509 and processes another pixel in the image data. Meanwhile, in the case of determining that every pixel in the image data has been processed (step S516; Yes), the air conditioning management device 500 stores the generated door/window position information 384 in the auxiliary storage 350, and ends the information generation process.

The foregoing is the operation of the air conditioning management device 500.

In this way, according to the air conditioning management device 300, the air conditioners 100, doors, and windows contained in a room are grouped, and the air conditioners 100 included in that group are specified as being in a wasteful operating state or not, without additional equipment. In addition, in the case of determining a wasteful operating state, a notification indicating a wasteful operating state is issued to the remote control device 110 connected to the relevant air conditioner 100. Thus, the user is able to quickly learn of a wasteful operating state, which contributes to quick resolution of the wasteful operation and promotes power efficiency.

Modifications

The invention is not limited to the foregoing embodiments, and various modifications and applications are possible. Although the foregoing embodiments illustrate an example of the air conditioning management devices 300 and 500 managing air conditioners 100, this is merely an example. The air conditioning management devices 300 and 500 may also manage the entire air conditioning apparatus representing the heat source unit (not illustrated) that includes a compressor or the like, as well as the air conditioners 100. In so doing, since information such as the operating state and position is acquired for not only the air conditioners 100 but also the heat source unit, it is possible to more effectively promote power efficiency.

Although the foregoing embodiments illustrate an example of conducting a wasteful operation notification process after finishing a wasteful operation determination process, this is merely an example. The wasteful operation notification process may also be initiated in parallel with the wasteful operation determination process every time an air conditioner 100 in a wasteful operating state is determined in the wasteful operation determination process. Doing so further contributes to quick resolution of the wasteful operation.

Although the foregoing embodiments illustrate an example of issuing a notification to a remote control device 110 in the wasteful operation notification process, an embodiment is not necessarily limited thereto. The recipient of a notification may be a mobile communication device such as a mobile phone carried by a resident rather than a remote control device 110, for example, and may also be both of the above devices. Furthermore, it may also be configured such that an alarm or other sound is emitted during a notification. Doing so may contributes to quick resolution of the wasteful operation, and make users even more mindful about preventing the wasteful operation.

In addition, although the foregoing embodiments illustrate an example of notifying a remote control device 110 of the label for an area containing a door and/or window inferred to be causing the wasteful operation in the wasteful operation notification process, this is merely an example. For example, the portion of the plan view for the room containing that door and/or window may be cut out from the plan view information 381, and an icon representing the door and/or window causing the wasteful operation may be displayed at the position indicated by the coordinate data. Doing so enables the user to visually ascertain the relative position of the door and/or window causing the wasteful operation, and thus enables the user to more easily identify the position of the door and/or window causing the wasteful operation. As a result, it is possible to further contribute to quick resolution of the wasteful operation.

Although the foregoing embodiments illustrate an example of specifying position information for each air conditioner 100 from coordinate positions on a plan view expressed by air conditioner installation position information 382, an embodiment is not necessarily limited thereto. For example, the air conditioners 100 themselves may measure distance information to other air conditioners 100 by technology such as Ultra Wide Band (UWB), and the air conditioning management device 300 or 500 may acquire the results from each air conditioner 100 and specify the position of each air conditioner 100. Doing so eliminates the need for the user to register the air conditioner installation position information 382 in the air conditioning management device 300 or 500 in advance, reducing the burden imposed during setup.

Also, although the foregoing embodiments illustrate an example of functioning as an area settings deriver 342 to determine air conditioners 100, doors, and windows installed in an area by using pixels representing corners on a plan view, this is merely an example. If a position is clearly not included in an area, an arbitrary pixel on the plan view may also be used.

Although the foregoing embodiments illustrate an example of functioning as a wasteful operation notifier 344 to divide the area of a room into nine sections, and thereby specify the orientation in the room where a door and/or window is positioned, this is merely an example. The number of subdivisions in a room area is arbitrary. Moreover, the area of a room may also be divided by creating a circumscribed square over the area of a room, and trisecting all line segments forming the square.

Having more subdivisions makes it possible to specify in further detail the orientation in the room where a door and/or window causing the wasteful operation is positioned.

An air conditioning management device 300 or 500 for realizing air conditioning management functionality according to embodiments of the present invention is realizable using an ordinary computer system rather than a specialized system. For example, it is possible to configure an air conditioning management device 300 or 500 that executes the processes discussed earlier by installing a program onto a general-purpose computer from a medium (such as a CD-ROM) storing an air conditioning management program 355 for executing the processes discussed earlier.

Additionally, in cases such as where the functionality discussed earlier is realized by being distributed between an Operation System (OS) and an application, or by the cooperative action of the OS and application, only the non-OS portion may be stored on the medium.

It is also possible to impress the air conditioning management program 355 onto a carrier wave for delivery via a communication network. For example, such a program may be posted on a Bulletin Board System (BBS) on a communication network, with the program delivered via the network. Then, such programs may be activated, and by being executed similarly to other application programs under control by an operating system, configure the computer system to be able to execute the processes discussed earlier.

Although the foregoing Embodiment 2 illustrates an example of generating room area information 383 and door/window position information 394 on the basis of plan view information 381, this is merely an example. For example, an air conditioner template may be stored in advance, and the air conditioner installation position information 382 may be generated on the basis of the plan view information 381. Doing so additionally reduces the user workload.

Although the foregoing Embodiment 2 illustrates an example of functioning as a room information deriver 346 to compute the distance between hues according to $((R-R_0)^2+(G-G_0)^2+(B-B_0)^2)^{1/2}$, this is merely an example. If the relative magnitudes are known, an arbitrary computation method may be used instead of the sum of the respective distances for (R, G, B). For example, the distance may be computed according to $(R-R_0)^2+(G-G_0)^2+(B-B_0)^2$ without using the square root. The formula may also be modified according to the background color.

Also, although the foregoing Embodiment 2 illustrates an example of functioning as a room information deriver 346 to recognize the most-used color as the background color, an embodiment is not necessarily limited thereto. For example, hues may be separated into given ranges, the hue range in which the most pixels in the plan view exist may be computed, and the median value of that hue range or the average value of that hue range may be taken to be the background color. In so doing, it is possible to use a construction blueprint or other document converted into image data as the plan view, rather than just taking image data generated by a personal computer or the air conditioning management device 300 as a plan view.

Although the foregoing Embodiment 2 illustrates an example of functioning as a room information deriver 346 to identify an area enclosed by horizontal and vertical boundary lines as a room, this is merely an example. For example, pixels representing diagonal boundary lines may also be specified, and an area containing a diagonal boundary line may be recognized as a room. Doing so makes it possible to recognize room shapes in more detail.

In addition, although the foregoing Embodiment 2 illustrates an example of functioning as a room information deriver 346 to determine the degree of matching between image data and respective templates by using template matching, this is merely an example. An embodiment is not limited to template matching, and another arbitrary technique may also be used insofar as the degree of matching between actual image data and respective templates can be determined.

Various modifications to the foregoing embodiments are possible within the scope of the principal matter of the present invention. The foregoing embodiments are for the purpose of describing the present invention, and are not intended to limit the scope of the present invention. The scope of the present invention is indicated by the attached claims rather than the embodiments. Various modifications made within the scope of the claims or their equivalents are to be included within the scope of the present invention.

INDUSTRIAL APPLICABILITY

The present invention may be suitably implemented as a device that controls facilities such as air conditioners.

REFERENCE SIGNS LIST

10 Air conditioning management system
20 Air conditioning management system
100 Air conditioner
102 Temperature sensor
103 Primary storage
104 Auxiliary storage
105 Controller
106 Communication interface
107 System bus
110 Remote control device
111 Display device
112 Input device
300 Air conditioning management device
310 Display device
320 Input device
330 Communication manager
340 Controller
341 Air conditioner controller
342 Area settings deriver
343 Wasteful operation determiner
344 Wasteful operation notifier
345 Primary storage
346 Room information deriver
350 Auxiliary storage
355 Air conditioning management program
357 Information generation program
360 Air conditioner data
361 Air conditioner connection information
362 Air conditioner operating state data
370 Area settings data
380 Installation position data
381 Plan view information
382 Air conditioner installation position information
383 Room area information
384 Door/window position information
390 Wasteful operation determination settings data
391 Temperature threshold value 392 Wasteful operation counter threshold value
399 System bus
400 Air conditioner icon
401 Room area line
402 Door icon
403 Window icon
410 Door template image
420 Window template image
500 Air conditioning management device

The invention claimed is:

1. An air conditioning management device mutually communicably connected to a plurality of air conditioners, comprising:
　a storage that stores connection information that indicate remote control devices respectively controlling the plurality of air conditioners, the air conditioners connected to these remote control devices, a plan view of a floor where the plurality of air conditioners are installed, air conditioner position information indicating the installation position of each of the air conditioners on the plan view, and door-window position information indicating the positions of at least one of a door and a window on the plan view;
　a wasteful operation determiner that determines whether or not any of the plurality of air conditioners are in a wasteful operating state; and
　a wasteful operation notifier which, in the case where wasteful operation determiner determines that at least one of the plurality of air conditioners is in the wasteful operating state, notifies that the air conditioner is in the wasteful operating state to the remote control device connected to that air conditioner, on the basis of the connection information stored in the storage, wherein
　the wasteful operation determiner further specifies the position of the at least one of the door and the window disposed at the approximate position causing the air conditioner determined to be in the wasteful operating state to enter the wasteful operating state, based on the air conditioner position information and the door-window position information of the plan view stored in the storage, and
　the wasteful operation notifier additionally
　　cuts out, from the plan view, a portion of the plan view which contains the at least one of the door and the window specified by the wasteful operation determiner, and
　　displays, on the cut out portion of the plan view, at the position indicated by the door-window position information corresponding to the door-window causing the wasteful operation, an icon representing the door-window causing the wasteful operation which notifies the position of the at least one of the door and the window specified by the wasteful operation determiner in the notification.

2. The air conditioning management device according to claim 1, wherein
　the storage stores an indoor temperature for each room in which the plurality of air conditioners are installed, and a set temperature for each of the plurality of air conditioners, and
　the wasteful operation determiner determines whether or not the air conditioner is in the wasteful operating state on the basis of the difference between an indoor temperature and a set temperature stored in the storage.

3. The air conditioning management device according to claim 2, wherein
　the wasteful operation determiner determines that the air conditioner is in the wasteful operating state in the case where the difference between the indoor temperature and the set temperature is equal to or greater than a threshold value over a period that continues for a given period or longer.

4. The air conditioning management device according to claim 1, wherein
　the storage additionally stores area settings data that groups each of the plurality of air conditioners, a plurality of doors, and a plurality of windows by area of installation, and
　the wasteful operation determiner specifies a plurality of one or more of doors and windows in an area where the air conditioner determined to be in the wasteful operating state is installed on the basis of the area settings data stored in the storage, and from among the specified plurality of one or more of doors and windows, specifies the position of at least one of the door and the window disposed at the approximate position causing the air conditioner determined to be in the wasteful operating state to enter the wasteful operating state, on the basis of the air conditioner position information and the door-window position information.

5. The air conditioning management device according to claim 4, wherein
　the storage additionally stores room area information including coordinate groups indicating the positions of each of a plurality of areas on the plan view,
　the air conditioning management device further comprising:
　　an area settings deriver that specifies the air conditioners and the plurality of one or more of doors and windows respectively existing in each of the plurality of areas indicated by the room area information on the basis of the room area information, the air conditioner position information, and the door-window position information, and derives the area settings data by associating the specified air conditioners and the plurality of one or more of doors and windows with the areas.

6. The air conditioning management device according to claim 5, further comprising:
　a room information deriver that specifies a background color on the basis of a hue of each pixel in image data of the plan view, derives the room area information by taking the coordinates of pixel groups whose difference versus the specified background color is equal to or greater than a threshold value as the coordinate groups of the areas, and derives the door-window position information by taking the positions of pixels in the plan view whose hue is equivalent to pixels stored in advance to be the positions of the plurality of one or more of doors and windows.

7. An air conditioning system comprising the air conditioning management device according to claim 1.

8. The air conditioning management device according to claim 1, wherein
　the storage additionally stores room area information including coordinate groups indicating the positions of each of a plurality of areas on the plan view,
　further comprising
　a room information deriver that specifies a background color on the basis of a hue of pixels in image data of the plan view, derives the room area information by taking the coordinates of pixel groups whose difference versus the specified background color is equal to or greater than a threshold value as the coordinate groups of the areas, and derives the door-window position information by taking the positions of pixels in the plan view whose hue is equivalent to pixels stored in advance to be the positions of the plurality of one or more of doors and windows.

9. The air conditioning management device according to claim 1, wherein
the door-window position information indicates coordinate positions of a plurality of doors and windows on the plan view which has a plurality of rooms, the doors and windows including the at least one of the door and the window,
the storage additionally stores room area information including coordinate groups indicating the positions of each of the plurality of rooms on the plan view,
the wasteful operation notifier further
determines, from the coordinate groups of the plurality of rooms and the coordinate position of the at least one of the door and the window, the portion of the plan view corresponding to a room of the plurality of rooms containing the at least one of the door and the window specified by the wasteful operation determiner,
wherein the determined portion which is cut out by the wasteful operation notifier is determined to correspond to the room containing the at least one of the door and the window specified the wasteful operation determiner,
wherein (i) the cut out portion which is displayed corresponds to the room which is cut out from the plan view and (ii) the icon representing the door-window causing the wasteful operation is displayed on the cut out portion at the coordinate position of the door-window in the room which is cut out from the plan view.

10. An air conditioning management method conducted by an air conditioning management device mutually communicably connected to a plurality of air conditioners, the air conditioning management method comprising:
an acquiring step that acquires connection information that indicate remote control devices respectively controlling the plurality of air conditioners, the air conditioners connected to these remote control devices, a plan view of a floor where the plurality of air conditioners are installed, air conditioner position information indicating the installation position of each of the air conditioners on the plan view, and door-window position information indicating the positions of at least one of a door and a window on the plan view;
a wasteful operation determining step that determines whether or not any of the plurality of air conditioners are in a wasteful operating state; and
a wasteful operation notifying step which, in the case where it is determined in the wasteful operation determining step that at least one of the plurality of air conditioners is in the wasteful operating state, notifies that the air conditioner is in the wasteful operating state to the remote control device connected to that air conditioner, on the basis of the connection information acquired in the acquiring step, wherein
the wasteful operation determining step that further specifies the position of the at least one of the door and the window disposed at the approximate position causing the air conditioner determined to be in the wasteful operating state to enter the wasteful operating state, based on the air conditioner position information and the door-window position information of the plan view acquired in the acquiring step, and
the wasteful operation notifying step that additionally
cuts out, from the plan view, a portion of the plan view which contains the at least one of the door and the window specified by the wasteful operation determiner, and
displays, on the cut out portion of the plan view, at the position indicated by the door-window position information corresponding to the door-window causing the wasteful operation, an icon representing the door-window causing the wasteful operation which notifies the position of the at least one of the door and the window specified in the wasteful operation determining step in the notification.

11. The air conditioning management method according to claim 10, wherein
the storage additionally stores room area information including coordinate groups indicating the positions of each of a plurality of areas on the plan view,
further comprising
a room information deriver that specifies a background color on the basis of a hue of pixels in image data of the plan view, derives the room area information by taking the coordinates of pixel groups whose difference versus the specified background color is equal to or greater than a threshold value as the coordinate groups of the areas, and derives the door-window position information by taking the positions of pixels in the plan view whose hue is equivalent to pixels stored in advance to be the positions of the plurality of one or more of doors and windows.

12. The air conditioning management method according to claim 10, wherein
the door-window position information indicates coordinate positions of a plurality of doors and windows on the plan view which has a plurality of rooms, the doors and windows including the at least one of the door and the window,
the storage additionally stores room area information including coordinate groups indicating the positions of each of the plurality of rooms on the plan view,
the wasteful operation notifier further
determines, from the coordinate groups of the plurality of rooms and the coordinate position of the at least one of the door and the window, the portion of the plan view corresponding to a room of the plurality of rooms containing the at least one of the door and the window specified by the wasteful operation determiner,
wherein the determined portion which is cut out by the wasteful operation notifier is determined to correspond to the room containing the at least one of the door and the window specified the wasteful operation determiner,
wherein (i) the cut out portion which is displayed corresponds to the room which is cut out from the plan view and (ii) the icon representing the door-window causing the wasteful operation is displayed on the cut out portion at the coordinate position of the door-window in the room which is cut out from the plan view.

13. A non-transitory computer readable storage medium having stored thereon a program executable by a computer causing the computer to be mutually communicably connected to a plurality of air conditioners to function as:

a storage that stores connection information that indicate remote control devices respectively controlling the plurality of air conditioners, the air conditioners connected to these remote control devices, a plan view of a floor where the plurality of air conditioners are installed, air conditioner position information indicating the installation position of each of the air conditioners on the plan view, and door-window position information indicating the positions of at least one of a door and a window on the plan view;

a wasteful operation determiner that determines whether or not any of the plurality of air conditioners are in a wasteful operating state; and a wasteful operation notifier which, in the case where wasteful operation determiner determines that at least one of the plurality of air conditioners is in the wasteful operating state, notifies that the air conditioner is in the wasteful operating state to the remote control device connected to that air conditioner, on the basis of the connection information stored in the storage, wherein the wasteful operation determiner further specifies, based on the plan view in the storage, the position of the at least one of the door and the window disposed at the approximate position causing the air conditioner determined to be in the wasteful operating state to enter the wasteful operating state, and the wasteful operation notifier additionally cuts out, from the plan view, a portion of the plan view which contains the at least one of the door and the window specified by the wasteful operation determiner, and displays, on the cut out portion of the plan view, at the position indicated by the door-window position information corresponding to the door-window causing the wasteful operation, an icon representing the door-window causing the wasteful operation which notifies the position of the at least one of the door and the window specified by the wasteful operation determiner in the notification.

14. The non-transitory computer readable storage medium according to claim 13, wherein the storage additionally stores room area information including coordinate groups indicating the positions of each of a plurality of areas on the plan view, further comprising:

a room information deriver that specifies a background color on the basis of a hue of pixels in image data of the plan view, derives the room area information by taking the coordinates of pixel groups whose difference versus the specified background color is equal to or greater than a threshold value as the coordinate groups of the areas, and derives the door-window position information by taking the positions of pixels in the plan view whose hue is equivalent to pixels stored in advance to be the positions of the plurality of one or more of doors and windows.

15. The non-transitory computer readable storage medium according to claim 13, wherein the door-window position information indicates coordinate positions of a plurality of doors and windows on the plan view which has a plurality of rooms, the doors and windows including the at least one of the door and the window, the storage additionally stores room area information including coordinate groups indicating the positions of each of the plurality of rooms on the plan view, the wasteful operation notifier further determines, from the coordinate groups of the plurality of rooms and the coordinate position of the at least one of the door and the window, the portion of the plan view corresponding to a room of the plurality of rooms containing the at least one of the door and the window specified by the wasteful operation determiner, wherein the determined portion which is cut out by the wasteful operation notifier is determined to correspond to the room containing the at least one of the door and the window specified the wasteful operation determiner, wherein (i) the cut out portion which is displayed corresponds to the room which is cut out from the plan view and (ii) the icon representing the door-window causing the wasteful operation is displayed on the cut out portion at the coordinate position of the door-window in the room which is cut out from the plan view.

* * * * *